US012076679B1

(12) United States Patent
Buth et al.

(10) Patent No.: US 12,076,679 B1
(45) Date of Patent: Sep. 3, 2024

(54) FILTER-HOUSING INTERFACE DESIGNS FOR HEATING, VENTILATION, AND/OR AIR CONDITIONING SYSTEMS

(71) Applicant: Research Products Corporation, Madison, WI (US)

(72) Inventors: Steven J. Buth, Madison, WI (US); Peter J. Davis, Madison, WI (US); John R. Genova, Madison, WI (US); Yiwu Yu, Madison, WI (US)

(73) Assignee: Research Products Corporation, Madison, WI (US)

( * ) Notice: Subject to any disclaimer, the term of this patent is extended or adjusted under 35 U.S.C. 154(b) by 0 days.

(21) Appl. No.: 18/499,042

(22) Filed: Oct. 31, 2023

Related U.S. Application Data

(60) Provisional application No. 63/524,029, filed on Jun. 29, 2023, provisional application No. 63/466,601, filed on May 15, 2023.

(51) Int. Cl.
*B01D 46/10* (2006.01)
*B01D 46/00* (2022.01)
*F24F 8/108* (2021.01)

(52) U.S. Cl.
CPC ......... *B01D 46/10* (2013.01); *B01D 46/0005* (2013.01); *F24F 8/108* (2021.01)

(58) Field of Classification Search
CPC . F24F 8/108; B01D 46/10; B01D 2201/0415; B01D 2201/4046; B01D 2201/4053; B01D 2265/026
USPC ....................................................... 210/236
See application file for complete search history.

(56) References Cited

U.S. PATENT DOCUMENTS

| 3,823,533 | A | 7/1974 | Alverson et al. |
| 5,613,759 | A | 3/1997 | Ludwig et al. |
| 5,794,397 | A | 8/1998 | Ludwig |
| 6,502,909 | B1 | 1/2003 | Swilik, Jr. et al. |
| 6,592,643 | B2 | 7/2003 | Shah et al. |
| 6,599,343 | B2 | 7/2003 | Fredrick et al. |
| 6,638,333 | B2 | 10/2003 | Schuld et al. |
| 6,652,613 | B2 | 11/2003 | Shah et al. |

(Continued)

FOREIGN PATENT DOCUMENTS

| CN | 206793234 | 12/2017 |
| DE | 10 2005 044 491 | 3/2007 |

(Continued)

*Primary Examiner* — Benjamin M Kurtz
(74) *Attorney, Agent, or Firm* — Foley & Lardner LLP

(57) ABSTRACT

A filter element for a heating, ventilation, and/or air conditioning (HVAC) system includes a filter media and a support element. The support element includes a first interface member, a second interface member, and a connecting member. The first interface member and the second interface member define opposing lateral ends of the support element and extend parallel to one another. The first interface member and the second interface member are engageable with complementary receiving structures of a rail to support the support element on the rail. The connecting member is coupled to the filter media and extends from the first interface member to the second interface member. The connecting member includes a concave portion extending from the first interface member and a convex portion extending from the second interface member.

20 Claims, 23 Drawing Sheets

(56) References Cited

U.S. PATENT DOCUMENTS

| | | | |
|---|---|---|---|
| 6,814,660 B1 * | 11/2004 | Cavett | B01D 46/10 |
| | | | 454/284 |
| 6,814,773 B2 | 11/2004 | Shah et al. | |
| 6,941,630 B2 | 9/2005 | Wynn | |
| 8,024,309 B1 | 9/2011 | Deshmukh et al. | |
| 8,157,881 B1 * | 4/2012 | Anoszko | B01D 46/0006 |
| | | | 55/497 |
| 8,388,717 B2 | 3/2013 | Livingstone et al. | |
| 8,641,794 B2 | 2/2014 | Gillilan | |
| 9,114,342 B2 | 8/2015 | Schuld et al. | |
| 9,320,998 B2 | 4/2016 | Gillilan | |
| 9,579,663 B2 | 2/2017 | McKinney | |
| 9,610,528 B2 | 4/2017 | Porbeni et al. | |
| 9,674,517 B2 | 6/2017 | Krancher et al. | |
| 9,682,339 B2 | 6/2017 | Jursich et al. | |
| 9,972,505 B2 | 5/2018 | Matsumoto et al. | |
| 10,213,721 B2 | 2/2019 | Elliott | |
| 10,286,351 B2 | 5/2019 | Schuld | |
| 10,350,533 B2 | 7/2019 | Barry et al. | |
| 10,379,199 B2 | 8/2019 | Diachina et al. | |
| 10,406,472 B2 | 9/2019 | Zhang et al. | |
| 10,427,077 B2 | 10/2019 | Baldinger | |
| 10,427,079 B2 | 10/2019 | Barry et al. | |
| 10,646,807 B2 | 5/2020 | Gorman | |
| D914,864 S | 3/2021 | Roblin | |
| 10,940,416 B2 | 3/2021 | Gregerson et al. | |
| 10,981,099 B2 | 4/2021 | Gregerson et al. | |
| 11,074,909 B2 | 7/2021 | Lee et al. | |
| 11,097,217 B2 | 8/2021 | Barry et al. | |
| 11,135,541 B2 | 10/2021 | Barry et al. | |
| 2010/0026354 A1 | 2/2010 | Utsunomiya et al. | |
| 2013/0305146 A1 | 11/2013 | Hashiba et al. | |
| 2014/0230385 A1 | 8/2014 | Schuld et al. | |
| 2015/0267927 A1 | 9/2015 | Zhang et al. | |
| 2017/0216756 A1 | 8/2017 | Fox et al. | |
| 2018/0290090 A1 | 10/2018 | Bowman | |
| 2019/0046909 A1 * | 2/2019 | Haas | B29C 45/14 |
| 2021/0106936 A1 | 4/2021 | Portelli | |

FOREIGN PATENT DOCUMENTS

| | | |
|---|---|---|
| JP | 2000-126529 A | 5/2000 |
| KR | 100504669 | 10/2005 |
| WO | WO-03/031025 | 4/2003 |
| WO | WO-2007/003390 | 1/2007 |
| WO | WO-2010/033695 A1 | 3/2010 |
| WO | WO-2012/162003 | 11/2012 |
| WO | WO-2013/123325 | 8/2013 |
| WO | WO-2015/090870 | 6/2015 |
| WO | WO-2017/053177 A1 | 3/2017 |
| WO | WO-2018/128990 A1 | 7/2018 |

* cited by examiner

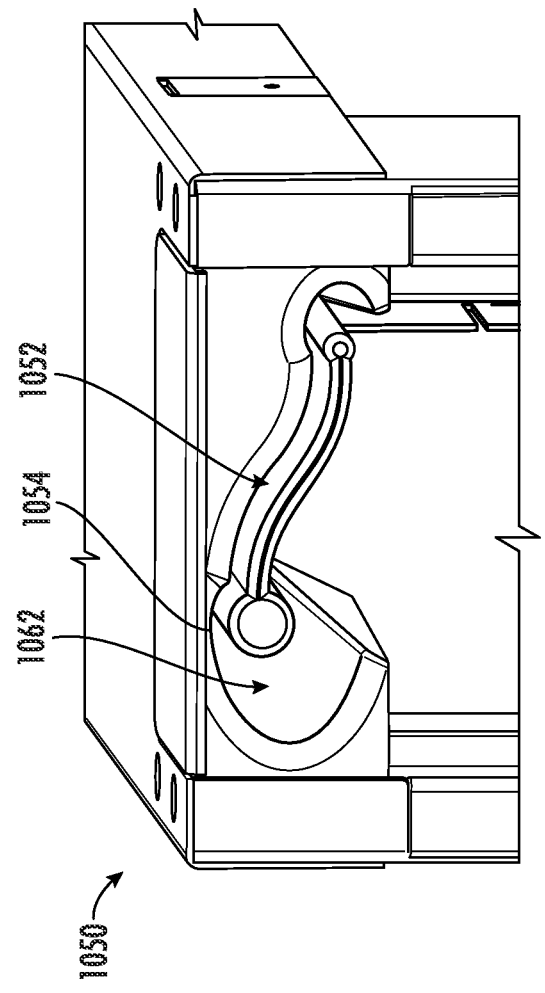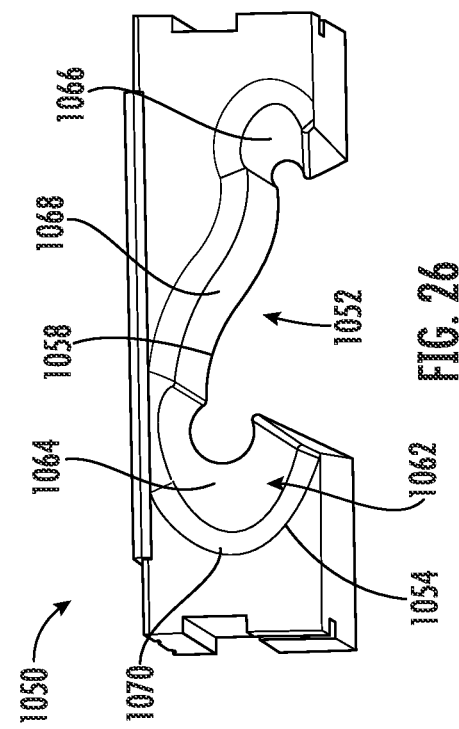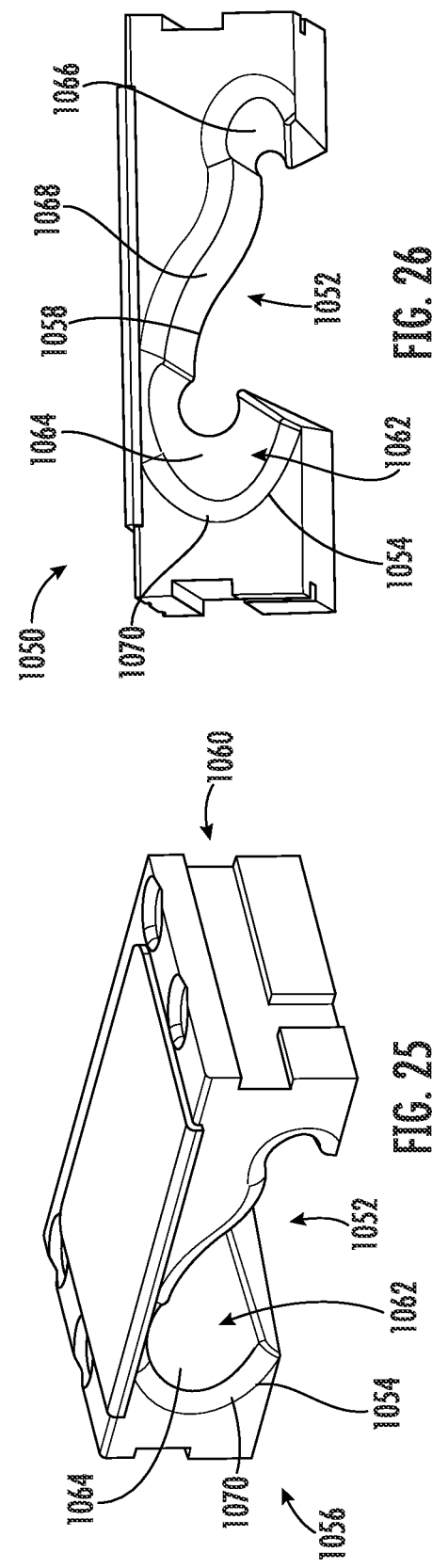

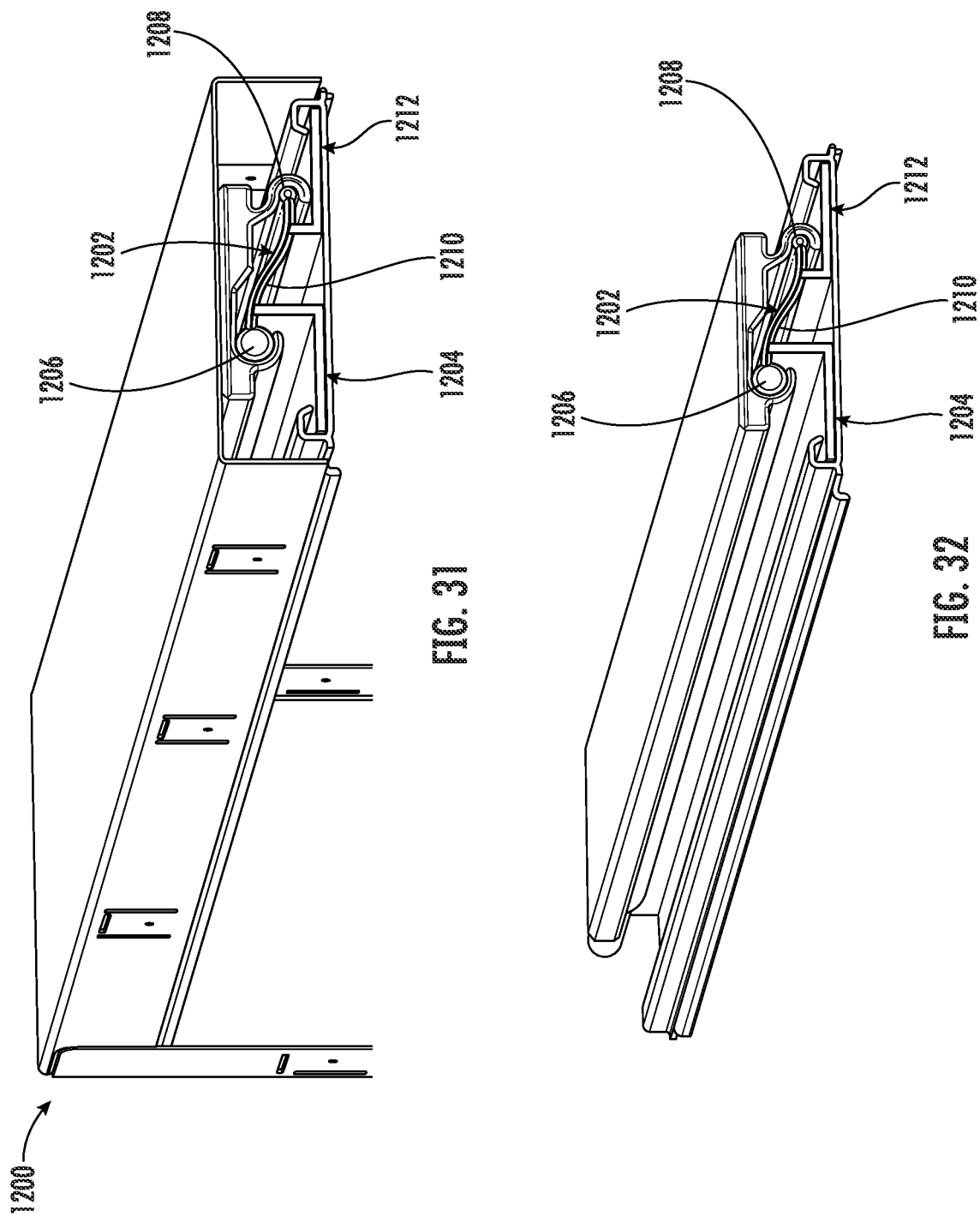

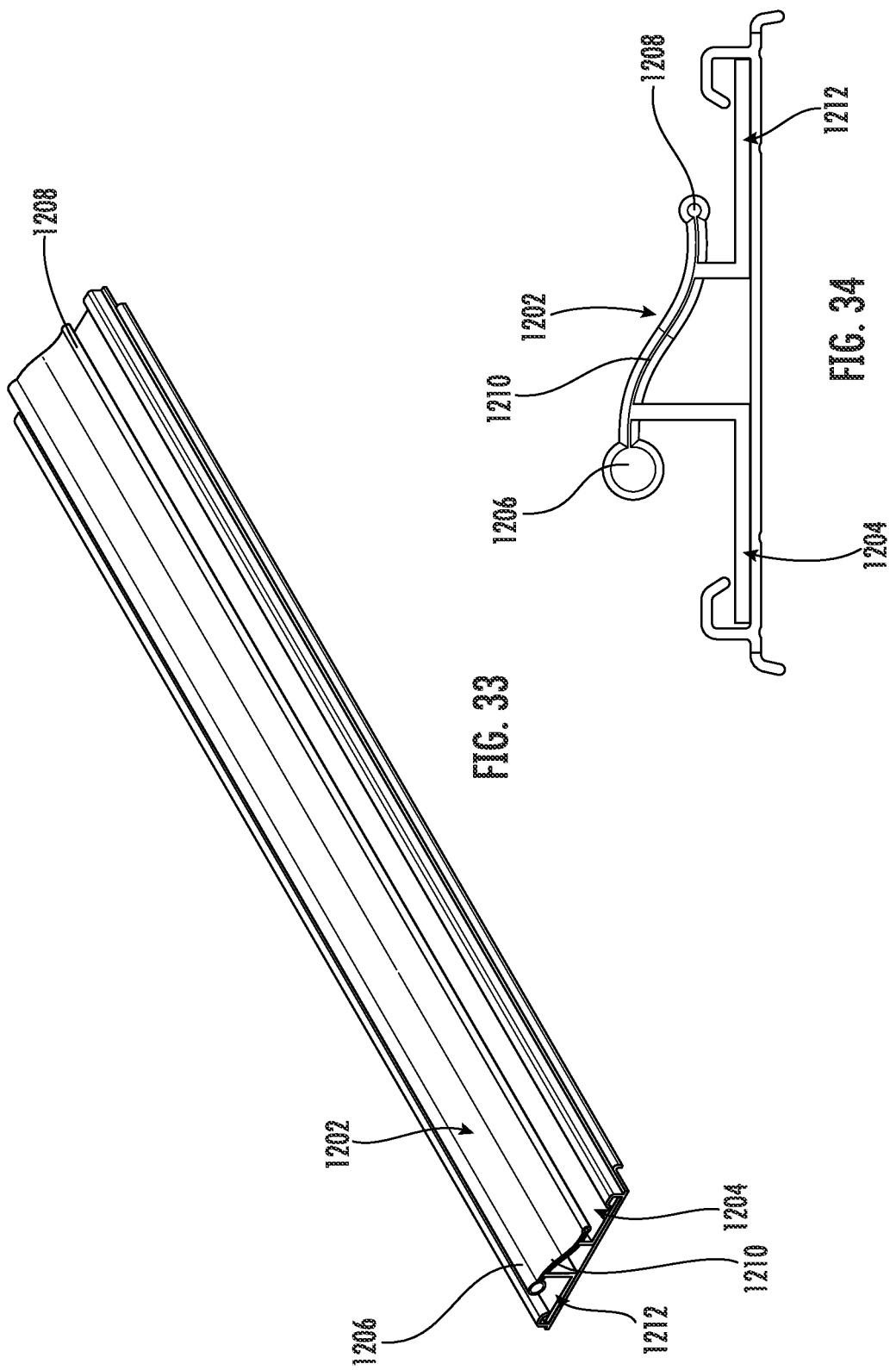

FILTER-HOUSING INTERFACE DESIGNS FOR HEATING, VENTILATION, AND/OR AIR CONDITIONING SYSTEMS

CROSS-REFERENCE TO RELATED PATENT APPLICATIONS

The present application claims the benefit of and priority to U.S. Provisional Patent Application No. 63/466,601, filed May 15, 2023, and U.S. Provisional Patent Application No. 63/524,029, filed Jun. 29, 2023, the entire contents of which are hereby incorporated by reference herein.

BACKGROUND

The present disclosure relates generally air filtration systems for removing particulate matter and other contaminants from air. More specifically, the present disclosure relates to filter-housing interface designs used to secure a filter element within a housing of an air filtration system.

SUMMARY

One embodiment relates a filter element that includes a filter media and a support element for a heating, ventilation, and/or air conditioning (HVAC) system. The support element includes a first interface member, a second interface member, and a connecting member. The first interface member defines a first lateral end of the support element. The second interface member defines a second lateral end of the support element and extends parallel to the first interface member. The first interface member and the second interface member are engageable with complementary receiving structures of a rail to support the support element on the rail. The connecting member is coupled to the filter media and extends from the first interface member to the second interface member. The connecting member includes a concave portion extending from the first interface member and a convex portion extending from the second interface member.

Another embodiment of the present disclosure relates to a support element for a filter element for an HVAC system. The support element includes a first interface member, a second interface member, and a connecting member. The first interface member extends along a longitudinal direction. The second interface member is spaced apart from the first interface member and extends parallel to the first interface member. The first interface member and the second interface member are engageable with complementary receiving structures of a rail to support the support element on the rail. The connecting member is configured to couple the first interface member and the second interface member to the filter media. The connecting member extends from the first interface member to the second interface member. The connecting member includes a concave portion extending from the first interface member and a convex portion extending from the second interface member.

Yet another embodiment relates to a method of making a filter element for an HVAC system. The method includes aligning a support element with an end pleat of a filter media so that the end pleat is disposed between a first interface member of the support element and a second interface member of the support member that extend along opposing lateral ends of the support element. The method also includes coupling the support element to the end pleat by bonding a connecting member of the support element that extends from the first interface member to the second interface member to the end pleat so that the end pleat extends across at least one of a concave portion of the connecting member that extends from the first interface member or a convex portion of the connecting member that extends from the second interface member.

BRIEF DESCRIPTION OF THE FIGURES

FIG. 24 is a front perspective view of a rail system for an air filter assembly, according to another embodiment.

FIG. 25 is a perspective view of a rail guide of the rail system of FIG. 24.

FIG. 26 is a front view of the rail guide of FIG. 25.

FIG. 31 is a front perspective view of an air filter assembly that includes a rail system, according to another embodiment.

FIG. 32 is a front perspective view of the rail system of FIG. 31.

FIG. 33 is a filter endplate adapter of the rail system of FIG. 32 shown with an endplate mounted onto the filter endplate adapter.

FIG. 34 is a front view of the filter endplate adapter of FIG. 32 shown with an endplate mounted onto the filter endplate adapter.

DETAILED DESCRIPTION

Figure 1:
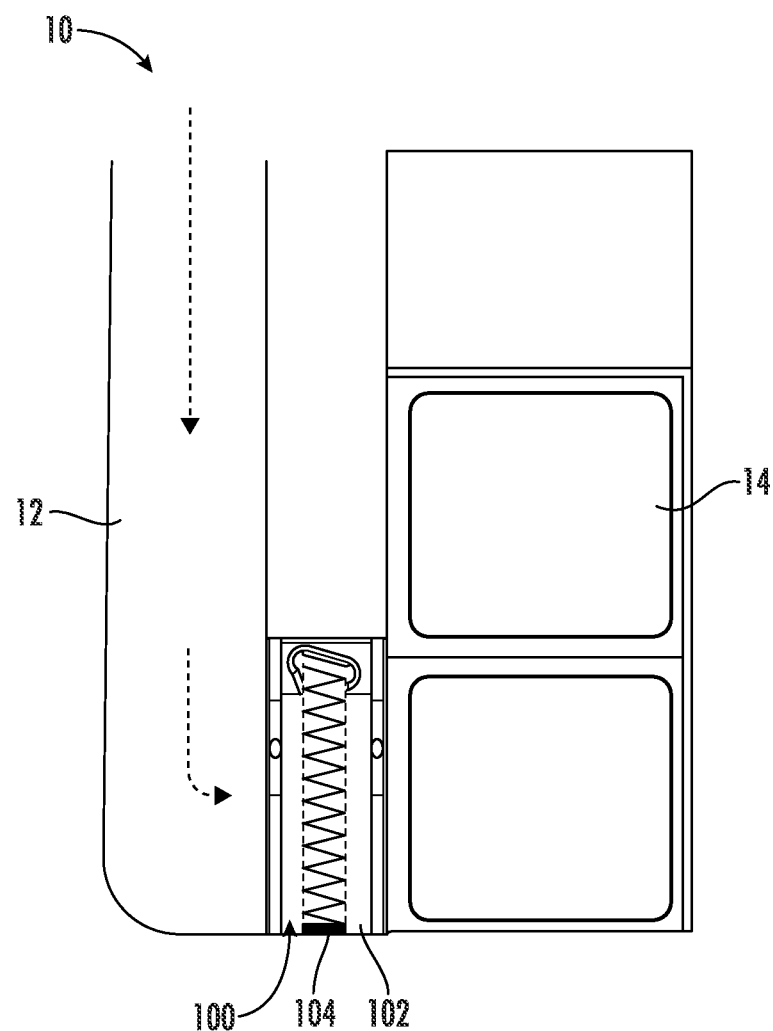
FIG. 1 is a front view of a heating, ventilation, and/or air conditioning (HVAC) system for a building, according to an embodiment.

Forced air heating, ventilation, and/or air conditioning (HVAC) systems are used in buildings to condition air within the building and to allow exchange of air with an environment surrounding the building. HVAC systems generally include an air filter assembly to remove contaminants, such as dirt, pollen, and other particulates from the air entering the building and during recirculation of indoor air to improve overall air quality within the building. These air filter assemblies may include a filter housing that supports a filter element having filter media to remove contaminants from air entering the HVAC system (e.g., a furnace, an air conditioning system, a dehumidifier, etc.). During operation, the filter media traps contaminants from air passing through the filter media, which can build up in the pores of the filter media, leading to increased restriction and pressure drop across the filter assembly, and ultimately requiring replacement of the filter element.

The performance of the filter element depends on a variety of factors, including the pressure drop across the filter element, the dust holding capacity of the filter element, and the efficiency of the filter element at removing dust and other particulate matter from the air (e.g., an amount of dust retained by the filter element divided by the total amount of dust entering the filter element with incoming air). The pressure drop affects the amount of energy needed to filter the air (e.g., fan size, etc.). The dust holding capacity affects the service life of the filter element (e.g., an amount of time that the filter element can be used before requiring replacement), and the efficiency affects the quality of air exiting the filter element (e.g., the indoor air quality).

Overview

In general, air filter housings may include a rail system including a housing rail (e.g., a rail member, etc.) that engages with an endplate structure of a filter element to secure the filter element in place within an air filter housing. Installation may require pre-orienting the filter element so that air passes through the filter element in a desired direction based on manufacturer specifications, such as based on a label applied to the filter element. Installation may also require aligning narrow openings of the endplate structure with edges or feed of a track in the housing to engage the filter element with the housing and to ensure proper sealing between the endplate structure and the housing. Such alignment operations require manual manipulation of the filter element and endplate structure to ensure that the endplate structure is fully engaged with the track.

Referring generally to the figures, air filter assemblies for HVAC system are shown that include a filter-housing interface that is configured to simplify installation of the filter element into the filter housing and to increase filter performance. The filter-housing interface features of the present disclosure are defined by an endplate structure (e.g., a support element, a frame element, etc.) that is configured to support the filter element within the filter housing. The filter-housing interface features of the present disclosure are configured to (i) simplify handling and installation of the filter element into the filter housing, (ii) reduce user error during servicing of the filter element, and (iii) improve the performance of the filter element during operation.

The endplate structure may be part of the filter element, or may be formed separately from the filter element and inserted onto or otherwise coupled to an endplate of the filter element. The endplate structure may be configured to facilitate handling of the filter element during installation and/or removal operations. For example, in at least one embodiment, the endplate structure includes a pair of interface members (e.g., attachment members, etc.) that define opposing lateral ends of the endplate structure. The interface members may be rounded/curved protrusions (e.g., cylindrical protrusions, protuberances, etc.), which can provide an ergonomic grip for the user when handling and during installation/removal operations. The rounded/curved protrusions of the interface members can also simplify alignment of the endplate structure with a housing rail of the filter housing and, due to the increased surface area of the endplate structure relative to planar endplates, can improve sealing performance. The rounded/curved protrusions can also reduce friction between the endplate structure and the housing rail during installation as the contact point between the protrusion and the housing rail occurs along the tangent edge (along a single point between the protrusion and receiving structure of the housing rail when viewed in cross-section normal to the insertion direction). Such an arrangement can therefore reduce the insertion force required to press the filter element into the filter housing during installation.

In some embodiments, the endplate structure is also configured to indicate to a user or technician the proper installation orientation of the filter element into the filter housing. For example, each of the interface members may include a different profile (e.g., size, shape, etc.) when viewed normal to an insertion direction of the filter element within the filter housing. These interface members are inserted into guide members on the housing rail, which have complementary shapes with the interface members. Such an arrangement can ensure that the filter element is inserted into the filter housing in the correct orientation. The keyed engagement between the interface members and the housing rails can also prevent the use of filter elements having lower performance than the original equipment, such as filter elements having poorer quality than the original equipment, and/or pressure drop characteristics that could reduce the service life of other HVAC equipment (e.g., blowers, etc.) over time.

The endplate structure and/or housing rail may include lead-ins (e.g., tapered and/or chamfered surfaces along an entry portion of the endplate structure and/or housing rail, etc.) to facilitate engagement between the endplate structure and the housing rail and to reduce complexity associated with aligning the endplate structure with the housing rail during installation. In some embodiments, the air cleaner assembly also includes an installation guide (e.g., a rail guide, an endplate funnel, etc.) that is coupled to the filter housing and that includes transition elements that interface with and facilitate the transition to guide members of the housing rail.

The endplate structure is also designed to improve performance of the air cleaner assembly. In some embodiments, the endplate structure includes a connecting member (e.g., a connecting wall, etc.) that engages and extends laterally between the interface members. The connecting member may be configured to increase flow performance of the filter element, for example, by providing a smooth flow transition along an upper wall of the filter housing into the filter element, thereby reducing pressure drop across the air cleaner assembly. For instance, the connecting member may include an undulating wall having a concave portion extending from a first interface member, and a convex portion extending from a second interface member of the endplate structure. The undulating transition can reduce areas of flow recirculation along the upper wall, increase face velocity of air passing through the end pleat of the filter media, thereby increasing flow uniformity across the filter media.

In at least one embodiment, the endplate structure may be supported at an angle within the filter housing, and/or be shaped to increase pleat spacing in an end pleat of the filter element, which can increase performance by reducing the restriction across the end pleat. The angle also increases the effective media area available for flow through the filter element by exposing the filter media at the end pleat to incoming air flow. The combination of the endplate geometry and orientation can reduce the pressure drop across the filter element and increase overall dust holding capacity, without requiring additional space with the filter housing.

In some embodiments, the filter element includes support features (e.g., ribbons, etc.) that support the endplate structure at the angle when the user expands the filter element. The angled orientation of the endplate structure can help instruct the user regarding which direction to insert the filter element into the filter housing. For example, the endplate structure and the end pleat may define a V-shaped arrowhead that indicates a flow direction through the filter element (e.g., an arrowhead that points toward the downstream end of the filter housing when the filter element is installed into the filter housing). The angle may also simplify manual manipulation of the filter element by allowing a user to grasp the endplate structure along a lateral end of the endplate structure and without having to pinch opposing ends of the endplate structure to maintain the filter element in an expanded position. In various embodiments, the angle may be varied to further improve ergonomics, and simplify manual manipulation by a user. These and other advantages of the various embodiments provided herein are described in more detail with respect to the figures.

Air Filter Assembly

Referring to FIG. 1, an air filter assembly 100 of an HVAC system 10 for a building is provided that filters recirculated air, and/or incoming air from an environment surrounding the building to produce clean, filtered, indoor air. In some embodiments, the HVAC system 10 is configured to condition (e.g., heat, cool, humidify, dehumidify, etc.) air a residential or commercial building, such as an apartment, an office building, a house, or another building type. In various embodiments, the air filter assembly 100 includes a filter housing 102 that supports a filter element 104 within the HVAC system 10. A first end (e.g., an inlet end, etc.) filter housing 102 is coupled to ductwork 12, which may be a return air duct configured to recirculate indoor air through the air filter assembly 100, a vent air duct configured to provide unfiltered outdoor air to the air filter assembly 100, or a combination thereof. A second end (e.g., an outlet end, etc.) of the air filter assembly 100 is coupled to a furnace 14 or another piece of HVAC equipment to provide a source of clean filtered air to the furnace. In other embodiments, the air filter assembly 100 may be coupled to other components of an HVAC system 10. For example, the filter housing 102 may be coupled to a return air vent within the building to filter air being recirculated into the HVAC system. In other embodiments, the filter housing 102 may be coupled to a dehumidifier assembly or to another piece of HVAC equipment. In yet other embodiments, the filter housing 102 may be coupled to a damper assembly or at a fresh air vent that fluidly couples the building to the outdoor environment.

The size and arrangement of the ductwork and furnace may be different depending on application requirements (e.g., flow rate requirements, building size, a location of the HVAC system 10 within the building, etc.). For example, the size of the ductwork and/or openings in the furnace (or other HVAC equipment) will increase for higher flow rate applications. The types of connections that may be used to fasten or otherwise couple the filter housing 102 to the HVAC system 10 may also be different in various embodiments.

Figure 2:
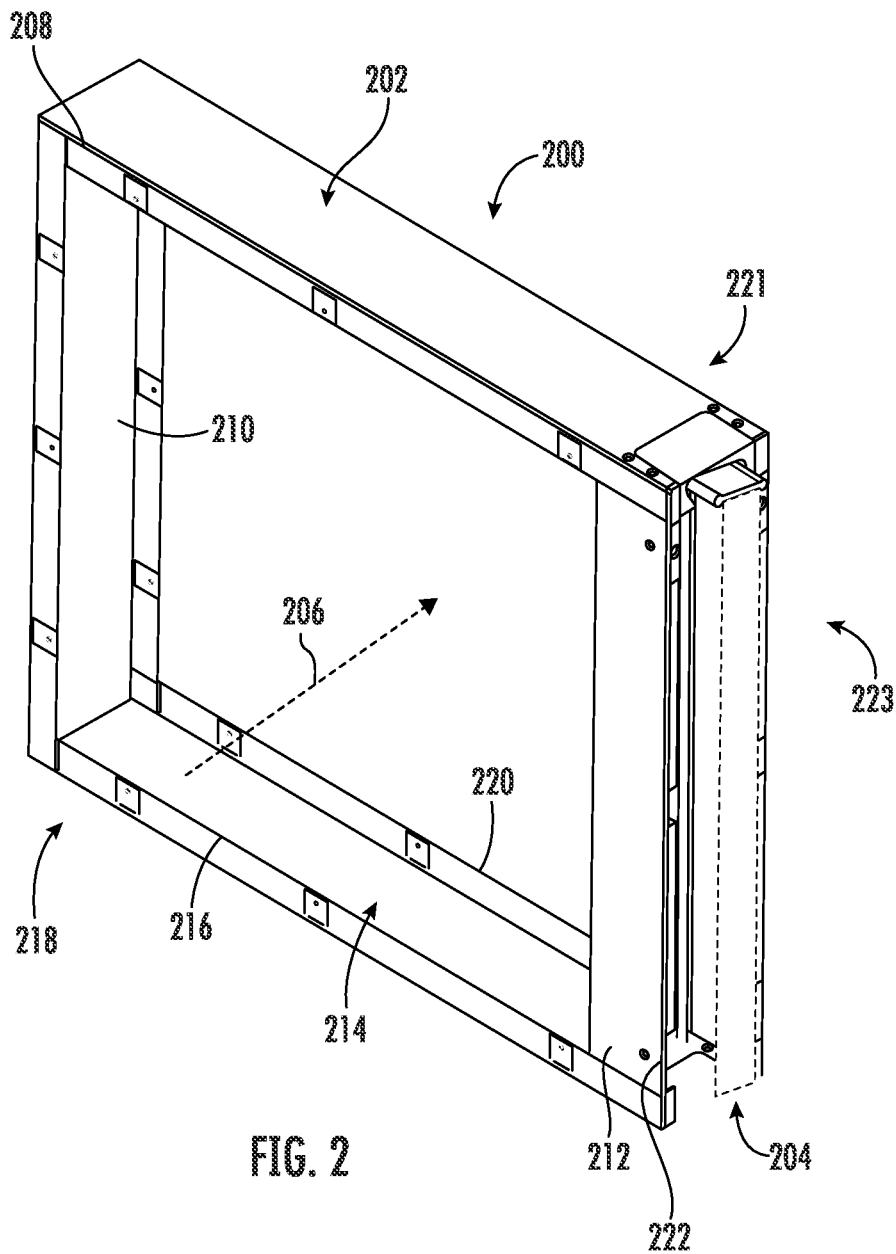
FIG. 2 is a perspective view of an air filter assembly, according to an embodiment.

Referring to FIG. 2, an air filter assembly 200 is shown that may be used in the HVAC system 10 of FIG. 1. The air filter assembly 200 includes a filter housing 202 and a filter element 204.

Filter Housing

The filter housing 202 is adapted to support the filter element 204 in a perpendicular orientation relative an air flow direction 206 through the filter housing 202, according to an embodiment. The filter housing 202 may be disposed along ductwork of the HVAC system, between a heating and/or cooling element and an inlet air duct that is configured to supply air to the heating and/or cooling element (as shown in FIG. 1). The inlet air duct may be coupled to a vent line that fluidly couples the HVAC system with an environment surrounding the building, and/or a return line that is configured to recirculate air from within the building to the heating and/or cooling element. The heating and/or cooling element may include a furnace, an air conditioner, a dehumidifier, or another piece of air quality and/or conditioning equipment.

In some embodiments (see FIG. 1), the filter housing 202 is directly coupled to an inlet of the heating and/or cooling element of the HVAC system. In other embodiments, the filter housing 202 is disposed in an area of the inlet air duct that is spaced apart from the heating and/or cooling element. In other embodiments, the filter housing 202 may be disposed in another location of the HVAC system, such as at an opening of a vent line for the HVAC system, a return grill location(s) in which air from a space within the building is returned to the HVAC system, or any other location at which a source of clean, filtered air is desired.

The filter housing 202 is configured to house the filter element 204 therein, and to facilitate installation of the filter element 204 into the filter housing 202, and removal therefrom. The filter housing 202 includes a frame 208, and a plurality of sidewalls 210 coupled to the frame 208. In other embodiments, the filter housing 202 does not include a frame that is separate from the plurality of sidewalls 210. For example, the sidewalls 210 may be formed and coupled to one another to form the filter housing 202 (e.g., the enclosure, the filter cabinet, etc.). The sidewalls 210 enclose at least three sides of the frame 208, including a lower side (e.g., a horizontally-oriented side, a floor of the filter housing 202, etc.), an upper side that is spaced vertically apart from, and oriented parallel to, the lower side, and connecting sides (e.g., vertically-oriented sides as shown in FIG. 2) extending between the upper side and the lower side. Together, the frame 208 and the plurality of sidewalls 210 form an enclosure 212 (e.g., a cabinet, etc.) that defines an interior cavity 214 sized to receive the filter element 204 therein.

The enclosure 212 further defines a plurality of duct openings, including a first opening 216 (e.g., an inlet opening, etc.) at a first lateral end 218 of the interior cavity 214, and a second opening 220 (e.g., an outlet opening, etc.) at a second lateral end 221 of the interior cavity 214 opposite the first lateral end 218.

In some embodiments, the first opening 216 is configured to be fluidly coupled to ductwork such as an inlet air duct and the second opening 220 is configured to be fluidly coupled to the heating and/or cooling element of the HVAC system (e.g., a furnace, an air conditioning unit, a humidifier, a dehumidifier, etc.). In other embodiments, the orientation of the first opening 216 and the second opening 220 may be reversed (e.g., the first opening 216 may be arranged as the second opening 220 for the filter assembly, etc.). The frame 208 and the plurality of sidewalls 210 also define an access opening 222 at a longitudinal end 223 of the interior cavity 214, between the first lateral end 218 and the second lateral end 221, that is configured to receive the filter element 204 therethrough.

Filter Element

Figure 3:
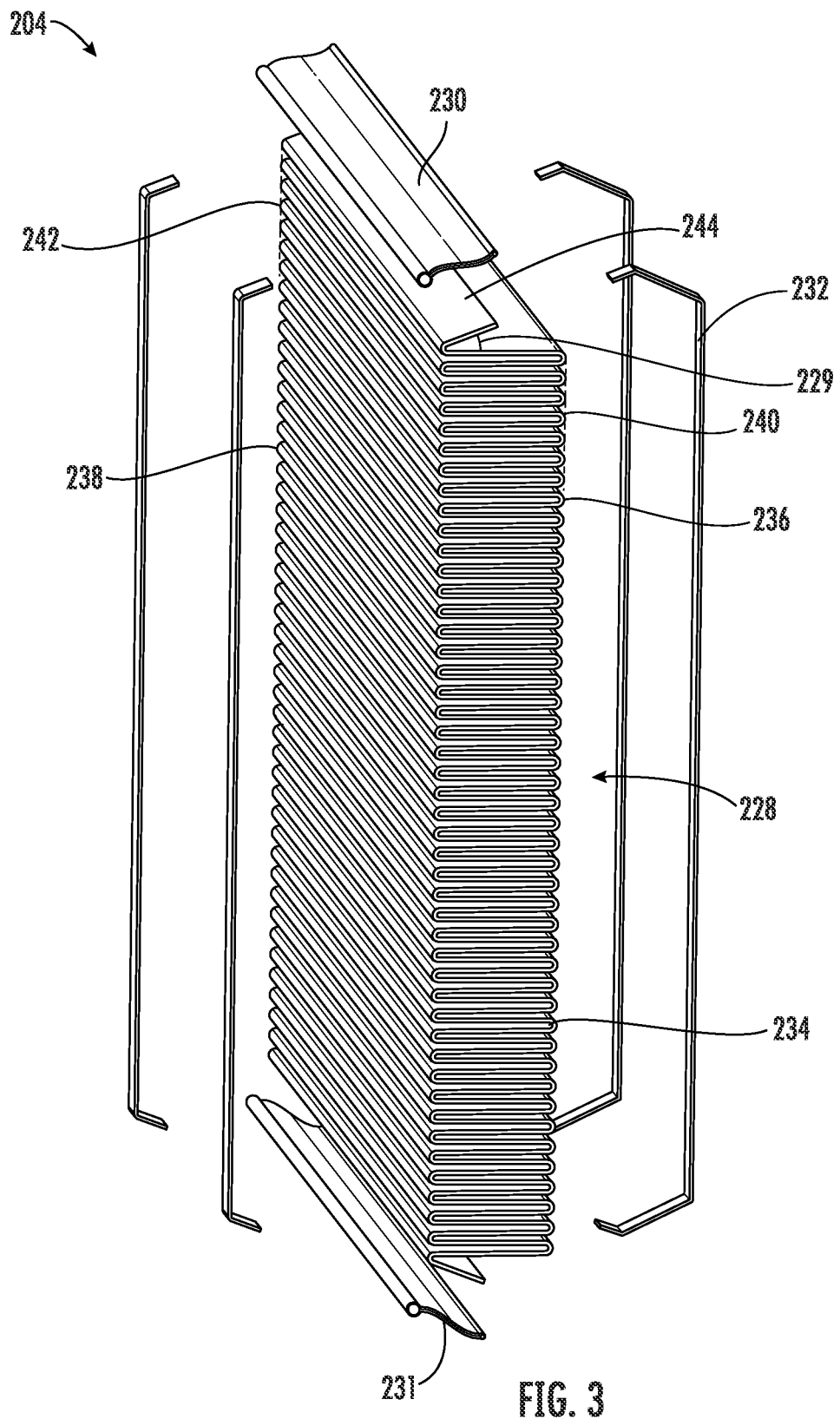
FIG. 3 is an exploded view of the filter element of FIG. 2.

Referring to FIG. 3, the filter element 204 includes a filter media pack 228; support elements including a first support element 230 and a second support element 231; and at least one media support element 232 for supporting the filter media pack 228 between the support elements. In other embodiments, the filter element 204 may include additional, fewer, and/or different components.

The filter media pack 228 is coupled to and extends between the first support element 230 and the second support element. The filter media pack 228 is formed from a pleated filter media 234. In the embodiment of FIG. 3, the filter media pack 228 includes filter media 234 that is pleated or folded back onto itself in an accordion pattern/shape. The filter media 234 is folded along a first plurality of bend lines 236 and a second plurality of bend lines 238. The first plurality of bend lines 236 together define a first face 240 (e.g., an upstream face, etc.) of the filter media pack 228. The second plurality of bend lines 238 together define a second face 242 (e.g., a downstream face, etc.) of the filter media pack 228 that is downstream of the first face 240. The first plurality of bend lines 236 and the second plurality of bend lines 238 extend linearly along the filter media 234 and are oriented substantially parallel to one another. The second plurality of bend lines 238 is disposed in alternating arrangement with the first plurality of bend lines 236. The first plurality of bend lines 236 and the second plurality of bend lines 238 are spaced in approximately equal intervals across a surface of the filter media 234.

The filter media pack 228 includes substantially linear wall segments of filter media 234 extending between adjacent ones of the first plurality of bend lines 236 and the second plurality of bend lines 238. The plurality of wall segments together define a plurality of channels that each extend between lateral ends (e.g., horizontally as shown in FIG. 3) of the filter media 234. The channels define U or V-shaped openings at longitudinal ends of the filter media pack 228.

In some embodiments, the filter media pack 228 includes a collapsible extended surface pleated media (CESPM) filter that is shipped to an end user in a collapsed state in which the pleats of the filter media 234 are pressed together to reduce the overall package size of the filter element 204. The filter media pack 228 is expanded by a user prior to installation in the filter housing (e.g., the filter housing 202 of FIG. 2). The filter element 204 may be expanded by separating opposing support elements to expose channels between pleats of the filter media 234. The filter media 234 may be a fibrous filter media made from a mat of synthetic fibers. In other embodiments, the filter media 234 is made from another filter media material including, but not limited to, synthetic fiber non-woven sheets, glass fiber non-woven sheets, combined synthetic and glass fiber non-woven sheets, natural fiber non-woven sheets, or combinations thereof. In other embodiments, the filter media 234 is made from another type of filtration material.

The first support element 230 (e.g., the first frame element, etc.) and the second support element 231 (e.g., the second frame element, etc.) are configured to support the filter media pack 228 in an expanded position within the filter housing 202. In the embodiment of FIG. 3, the first support element 230 and the second support element 231 are endplates (e.g., endcaps, etc.) that are engaged with and coupled to opposing ends of the filter media pack 228. In some embodiments, the first support element 230 is bonded to the filter media pack 228, to an end pleat 244 of the filter media pack 228 using glue, epoxy, or another adhesive product. In other embodiments, the first support element 230 is mechanically fastened (e.g., stapled, etc.) to the filter media pack 228 or directly coupled to the filter media pack 228 using ultrasonic welding. In other embodiments, the first support element 230 is a rail interface member formed separately from the filter element 204 that is configured to couple the filter element 204 to the housing rail 248 (see FIG. 2). For example, the first support element 230 may include (e.g., define) an endplate adapter (e.g., endplate rail guides, a clip member, etc.) that is engageable with a separate endplate/endcap of the filter element 204 on a first end, and the housing rail 248 on a second end, as will be further described.

In some embodiments, the first support element 230 has the same design as the second support element 231, which can simplify manufacturing of the filter element 204. In other embodiments, the design of the first support element 230 and the second support element 231 are different.

The media support element(s) 232 are configured to prevent over-expansion of the filter element 204 (e.g., the filter media pack 228) and to maintain uniform pleat spacing along the filter media pack 228 (between the first support element 230 and the second support element 231). In the embodiment of FIG. 3, the filter element 204 includes a plurality of media support elements 232, including two diametrically opposed pairs of media support elements 232 extending across the first face 240 and the second face 242. The media support elements 232 may be bonded, woven, or otherwise coupled to the filter media pack 228 at pleat tips of the filter media pack 228. In some embodiments, the media support elements 232 are also coupled to the support element(s) to limit rotation of the support element(s) relative to the filter media pack 228. For example, the media support elements 232 may limit an angle 229 defined by the end pleat 244 (e.g., between the support element and the filter media pack 228) in the fully expanded position to approximately two times the average pleat angle, three times the average pleat angle, 35°, 45°, 55°, or any angle between and including any of the foregoing values, or another angle that is greater than the average pleat angle across the filter media pack 228.

Rail System

Figure 5:
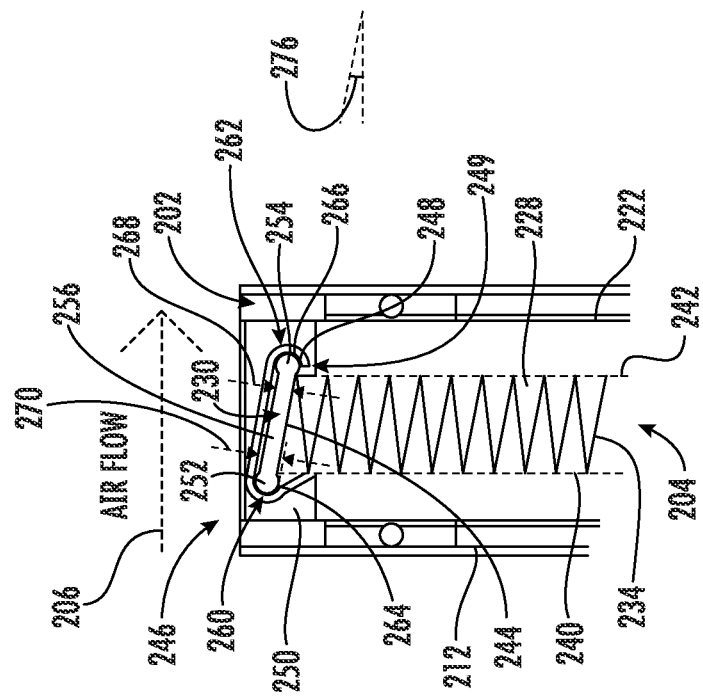
FIG. 5 is a front view of the portion of the air filter assembly of FIG. 4.
Figure 4:
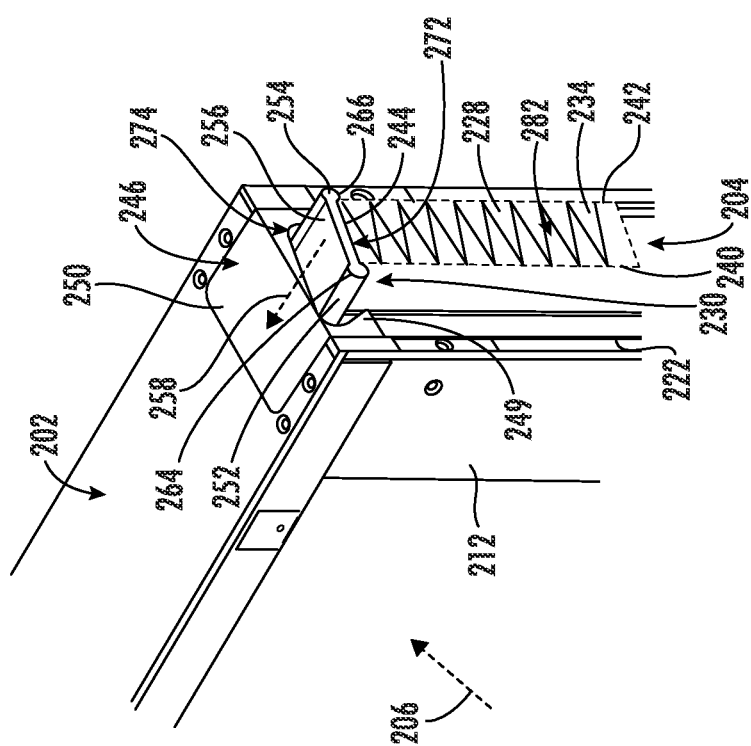
FIG. 4 is a perspective view of a portion of the air filter assembly of FIG. 2 showing the filter element being inserted into a filter housing.

Referring to FIGS. 4-5, the support element(s) of the filter element 204 may form part of a rail system 246 that is configured to facilitate installation of the filter element 204 into the filter housing 202, and removal therefrom. The rail system 246 includes the first support element 230, a housing rail 248 (e.g., a rail member, etc.), and a rail guide 250.

The first support element 230 is configured to slidably engage the housing rail 248 to support the filter media pack 228 in an expanded position within the filter housing 202. The first support element 230 includes a pair of interface members, shown as first interface member 252 and second interface member 254, and a connecting member 256.

The interface members (e.g., interface elements, interface bodies, etc.) are configured to facilitate handling of the filter element 204 and installation of the filter element 204 into the filter housing 202. The first interface member 252 and the second interface member 254 are engageable with complementary receiving structures 249 of the housing rail 248 to support the first support element 230 on the housing rail 248.

Referring still to FIGS. 4-5, the first interface member 252 extends along a longitudinal direction 258 that is perpendicular to the air flow direction 206 through the filter housing 202. The first interface member 252 defines a first lateral end 260 (e.g., a first lateral edge, etc.) of the first support element 230. In at least one embodiment, the first interface member 252 extends along an entire length of the first support element 230, from a first longitudinal end of the first support element 230 to a second longitudinal end of the first support element 230.

The second interface member 254 is spaced laterally apart from the first interface member 252 and extends parallel to the first interface member 252. The second interface member 254 defines a second lateral end 262 (e.g., a second lateral edge, etc.) of the first support element 230 that is opposite the first lateral end 260. In at least one embodiment, the second interface member 254 extends along an entire length of the first support element 230, from a first longitudinal end of the first support element 230 to a second longitudinal end of the first support element 230.

As used herein, "interface member" refers to a broad class of structures that are engageable with the housing rail 248 to support the first support element 230 at least partially within the housing rail 248. In some embodiments, the interface members are protuberances that extend along opposing lateral ends of the first support element 230. For example, at least one interface member may include a rounded head or bulb extending along the first lateral end 260 of the first support element 230. In other embodiments, the interface members may include slots, notches, indents, recessed areas, and/or channels extending along the lateral ends of the first support element 230.

In some embodiments, at least one of the interface members includes a cylindrical protrusion that extends along the lateral end. The protrusion may have a smooth/continuous curved side surface. In other embodiments, the interface members may include shapes that approximate a cylindrical protrusion such as an octagon having at least one planar side surface. In other embodiments, the interface member may include a differently shaped protrusion, protuberance, and/or prism, such as an elliptical protrusion having curved side surfaces, a triangular protrusion, a rectangular protrusion, or another polygonal prism having curved or uncurved edges that extend along the longitudinal direction 258. In still further embodiments, at least one of the interface members includes multiple protrusions that are contiguous with one another (e.g., two cylindrical protrusions that are stacked together, etc.). The protrusions of the first support element 230 each provide an ergonomic grip on a respective one of the lateral ends of the first support element 230, which can facilitate manual manipulation and handling of the filter element 204 by a user or technician. The protrusions can also simplify alignment between the first support element 230 and the housing rail 248 by providing a visually perceptible reference on each side of the first support element 230 that is easier to visually track and maintain in alignment with corresponding structures on the filter housing 202 during insertion. The larger surface area of the protrusions can also improve sealing between the filter element 204 and the filter housing 202 by increasing a length of the passage formed between the lateral ends of the first support element 230 and the filter housing 202 (e.g., the housing rail 248).

In the embodiment of FIGS. 4-5, the first interface member 252 has a first cross-sectional profile 264 (e.g., cross-sectional shape, an outline, etc.), and the second interface member 254 has a second cross-sectional profile 266 that the same as the first cross-sectional profile 264. As used herein, "cross-sectional profile" may refer to any of a perimeter outline defined by the interface member(s), or a cross-sectional shape of the interface member(s) when viewing the first support element 230 along the longitudinal direction 258 (e.g., along an insertion direction of the filter element 204 into the filter housing 202, as shown in FIG. 5).

In the embodiment of FIGS. 4-5, the first interface member 252 and the second interface member 254 each have a circular cross-sectional shape. In other embodiments, the cross-sectional shape of one or both of the first interface member 252 and the second interface member 254 is different. For example, at least one of the interface members may have an elliptical cross-sectional shape, an oval cross-sectional shape, or another curved or rounded cross-sectional shape having curved side surfaces. In other embodiments, at least one of the interface members may have a polygonal cross-sectional shape having curved or uncurved sides.

In the embodiment of FIGS. 4-5, the first interface member 252, the second interface member 254, and the connecting member 256 together define a dog-bone shape when viewed from a longitudinal end of the first support element 230 and having protuberances at either end that interface with the housing rail 248.

The connecting member 256 couples the first interface member 252 to the second interface member 254. In the embodiment of FIGS. 4-5, the connecting member 256 is also configured to couple the first support element 230 to the filter media pack 228 (e.g., the filter media 234).

The connecting member 256 is engaged with both the first interface member 252 and the second interface member 254 and extends from the first interface member 252 to the second interface member 254 (e.g., in a substantially lateral direction across the end pleat 244). In the embodiment of FIGS. 4-5, the connecting member 256 is, or includes, a planar wall. In other embodiments, the connecting member 256 may have curved portions as will be further described.

In at least one embodiment, a thickness 268 of the connecting member 256 is less than a thickness 270 of at least one of the interface members, such that an overall thickness of the first support element 230 increases moving from a central portion of the first support element 230 toward at least one lateral end of the first support element 230.

In some embodiments, the connecting member 256 is bonded directly to an end pleat 244 of the filter media pack 228 across a face of the end pleat 244 (e.g., across the entire face, etc.). In such embodiments, the end pleat 244 may extend along a surface of the connecting member 256 that extends from an inner edge of the first interface member 252 to an inner edge of the second interface member 254. Together, the first interface member 252, the second interface member 254, and the connecting member 256 define a media receiving channel 272 having a width that is approximately the same as a width of the end pleat 244. The media receiving channel 272 can facilitate assembly by providing an enclosed region in which to receive an adhesive material for bonding the end pleat 244 to the first support element 230.

In at least one embodiment, the first interface member 252, the second interface member 254, and the connecting member 256 are integrally formed as a monolithic body from a single piece of material. For example, the first support element 230 may be formed from plastic (e.g., polypropylene, nylon, glass-filed nylon, etc.) via an injection molding operation. The uniform cross-sectional shape of the first support element 230 (between opposing longitudinal ends of the first support element 230) also enables forming of the first support element 230 using an extrusion operation. Other materials may be used in various embodiments.

Referring still to FIGS. 4-5, the housing rail 248 is coupled (e.g., welded, fastened, bonded, etc.) to the enclosure 212, to an upper sidewall of the enclosure 212 and extends in a longitudinal direction between the access opening 222 and an opposing longitudinal end of the enclosure 212. The housing rail 248 includes complementary receiving structures 249 (e.g., rail members, rail legs, etc.). In some embodiments, the complementary receiving structures 249 each have a shape that corresponds with the cross-sectional shape of the interface members (with a respective one of the interface members). For example, in some embodiments, the complementary receiving structures 249 are track members that define a track that is configured to slidably engage the first support element 230.

In some embodiments, each of the track members has a curved shape that matches a cross-sectional profile of a respective one of the interface members. For example, the track members may have a circular cross-section having a radius that is larger than a radius of a respective one of the interface members so that the interface members nestably engage the track members. Such an arrangement can also improve sealing between the track members and the interface members, due to smaller passage size between the track members and the interface members. In other embodiments, such as where the filter housing includes a rail guide (as discussed in further detail below), the cross-sectional shape of the track members may be different from the cross-sectional shape of the interface members. For example, the track members may have a rectangular shaped cross-section that is sized to receive and support a cylindrically shaped interface member therein. In other embodiments, another shape may be used for the track members in the filter housing.

The receiving structures 249 may be made from metal or another strong and lightweight material that is welded, fastened, or otherwise coupled to the enclosure 212. The complementary receiving structures 249 define a pair of channel openings 274 spaced laterally apart from one another. Each one of the pair of channel openings 274 is configured to receive a respective one of the first interface member 252 and the second interface member 254 therein.

In the embodiment of FIGS. 4-5, the pair of channel openings 274 and the interface members have complementary cross-sectional shapes. In this way, the channel openings 274 form a keyed interface between the first support element 230 and the housing rail 248, which can prevent the use of aftermarket filter elements having reduced performance in comparison to a genuine filter element, and/or characteristics that could result in damage to other HVAC equipment over time (e.g., damage due to poor loading/pressure drop characteristics, media strength, etc.).

The rail system 246 is configured to support the filter media pack 228 within the filter housing 202. In the embodiment of FIGS. 4-5, the housing rail 248 is configured to support the first support element 230 at an angle 276 relative to the air flow direction 206 through the air filter assembly 200. In some embodiments, the angle 276 is an oblique angle relative to the air flow direction 206 such that a first height 278 of the filter element 204 at the first lateral end 218 of the filter element 204 (e.g., the first lateral end of the first support element 230) is greater than a second height 280 of the filter element 204 at the second lateral end 221 (e.g., the second lateral end of the first support element 230). In some embodiments, the angle 276 is greater than or equal to an average pleat angle 282 of individual pleats in the filter media pack 228 (see FIG. 4).

The angled orientation of the first support element 230 increases pleat spacing proximate to the end pleat 244 so that an area of the first face 240 of the filter media pack 228 is greater than an area of the second face 242 of the filter media pack 228. Increasing the filter media area near the end pleat 244 can increase the effective media area exposed to air flow, thereby reducing restriction along an upper wall of the filter housing 202, which can increase the overall performance of the air filter assembly 200.

In the embodiment of FIGS. 4-5, the rail system 246 also includes a rail guide 250 (e.g., an alignment element, etc.) that is configured to simplify the process of aligning the first support element 230 with the housing rail 248. The rail guide 250 includes at least one tapered surface, angled surface, or chamfer defining a lead-in between the access opening 222 and the housing rail 248, as will be further described.

Figure 6:
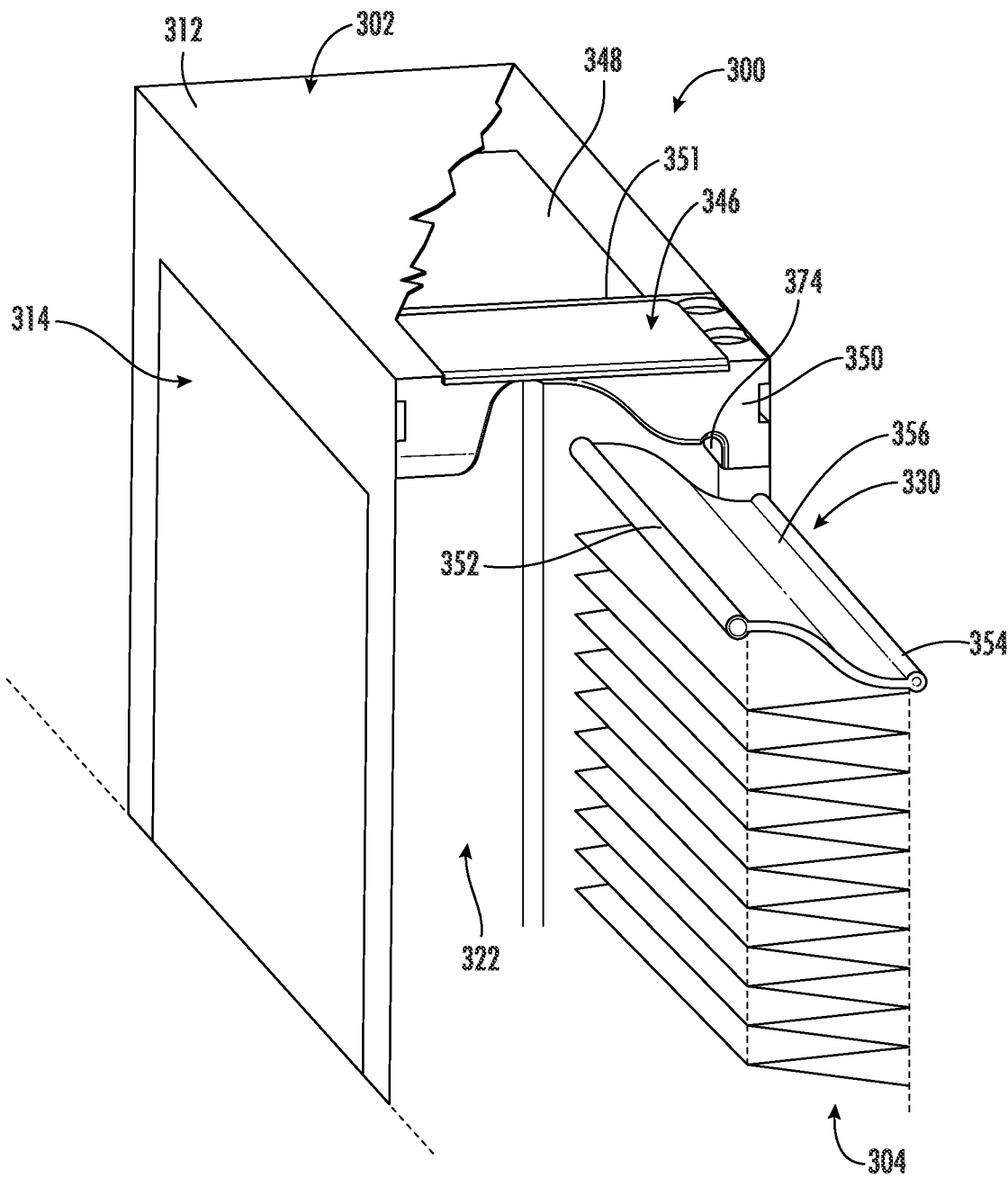
FIG. 6 is a perspective view of an air filter assembly, according to another embodiment.
Figure 7:
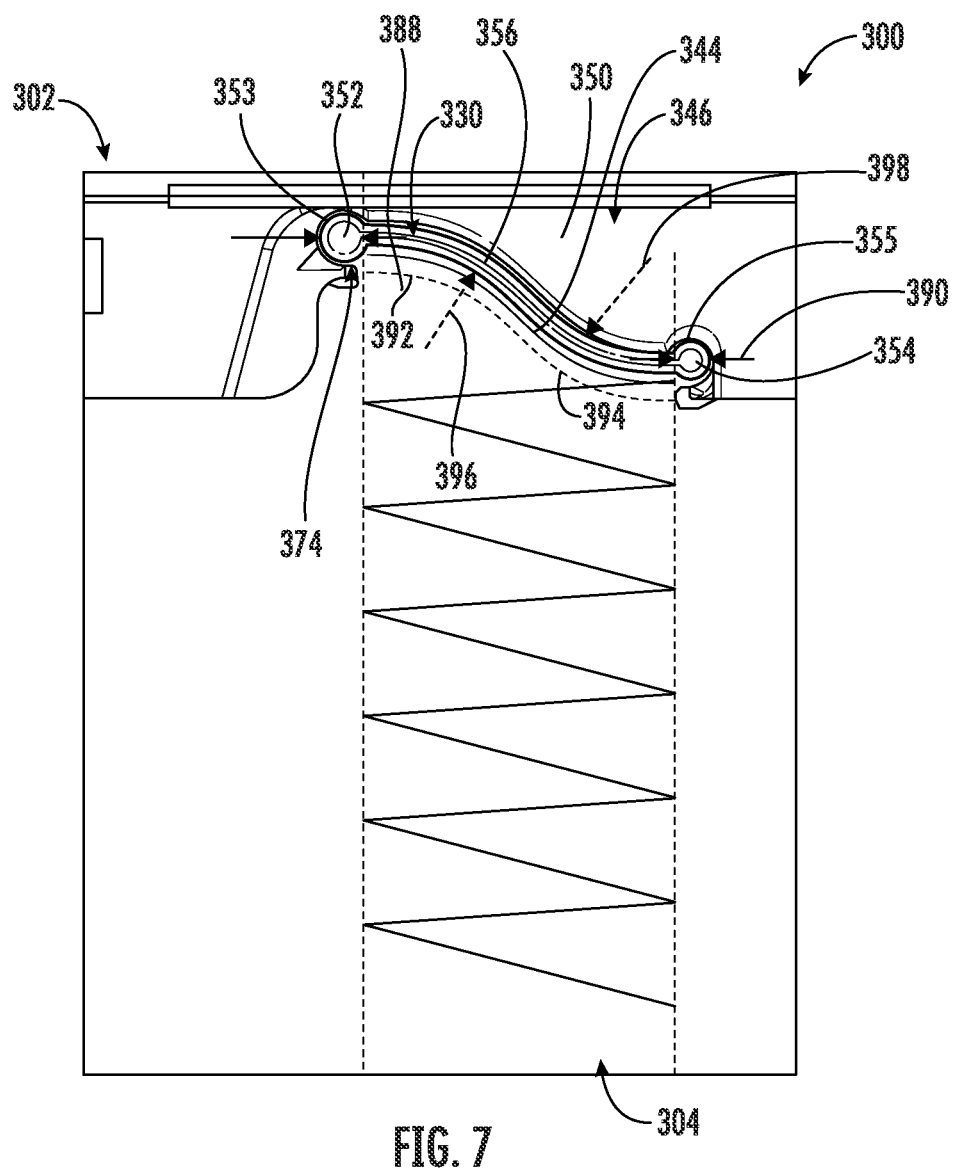
FIG. 7 is a front view of the air filter assembly of FIG. 6.

Referring to FIGS. 6-7, another rail system 346 for an air filter assembly 300 is shown that is configured to further increase flow performance of the air filter assembly 300. The rail system 346 includes a support element 330, a housing rail 348, and a rail guide 350. In other embodiments, the rail system 346 may include additional, fewer, and/or different components.

Similar to the first support element 230 of FIGS. 4-5, the support element 330 of FIGS. 6-7 includes a first interface member 352, a second interface member 354, and a connecting member 356. The first interface member 352 and the second interface member 354 are configured to provide a user or technician with an indication of the proper insertion direction of the filter element 304 into the filter housing 302.

Referring to FIG. 7, the first interface member 352 has a first cross-sectional profile 353. The second interface member 354 has a second cross-sectional profile 355 that is different from the first cross-sectional profile 353. In the embodiment of FIG. 7, an outer dimension of the first interface member, shown as width 388, is greater than an outer dimension of the second interface member 354, shown as width 390. The channel openings 374 of the housing rail 348 are sized to slidably engage a respective one of the first interface member 352 and the second interface member 354 so that the support element 330 may only be inserted in a single orientation into the housing rail 348. Such an arrangement can prevent improper installation of the filter element 304 (which may have multiple layers stacked in a particular arrangement along the flow direction), and can eliminate the need for separate indicators on the filter element 304 that provide a user with an indication of the proper air flow direction therethrough.

The size and shape of the first interface member 352 and the second interface member 354 may be different in various embodiments. For example, referring to FIGS. 8-9, a support element 430 for a filter element is shown in which the difference between the size of the first interface member 452 and the second interface member 454 is greater than that described with reference to FIG. 7. Such an arrangement can simplify identification of the proper orientation of the filter element, and can also increase the structural strength at the leading end (e.g., an upstream end, a first lateral end 460, etc.) of the support element 430 against forces resulting from the pressure drop across the filter element.

Figure 8:
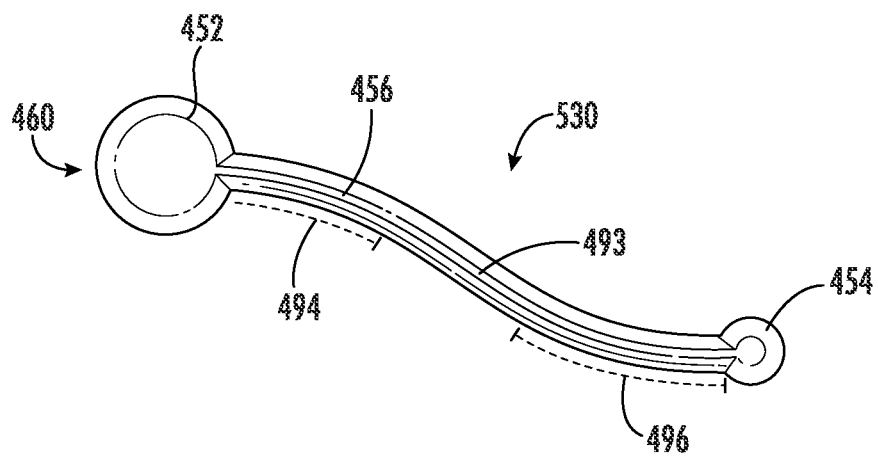
FIG. 8 is a front view of a support element of a filter element for an air cleaner assembly, according to an embodiment.
Figure 9:
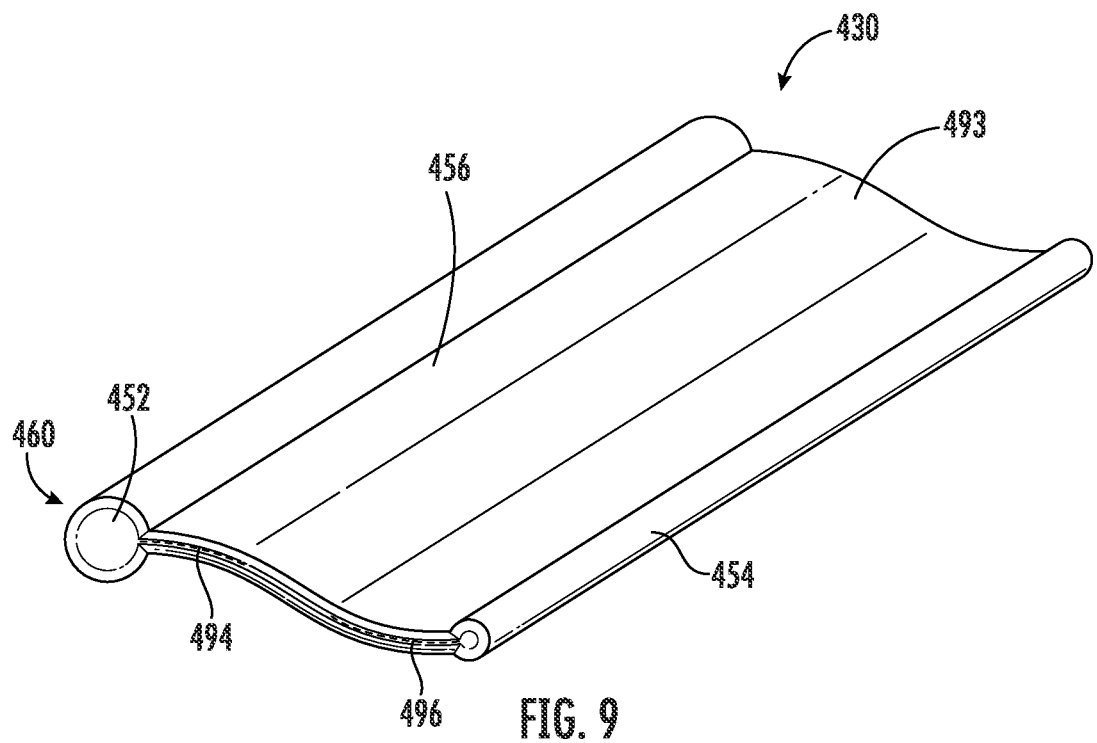
FIG. 9 is a perspective view of the support element of FIG. 8.

In the embodiment of FIGS. 8-9, both the first interface member 452 and the second interface member 454 have the same cross-sectional shape when viewed along the longitudinal direction. In other embodiments, the shape of the first interface member 452 and the second interface member 454 may be different from one another.

Figure 10:
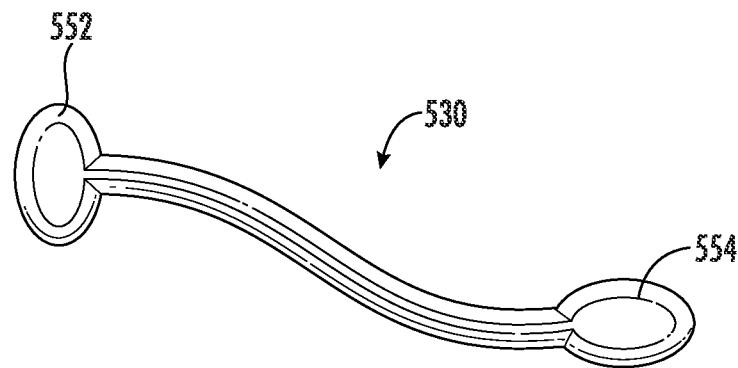
FIG. 10 is a front view of a support element of a filter element for an air cleaner assembly, according to another embodiment.
Figure 11:
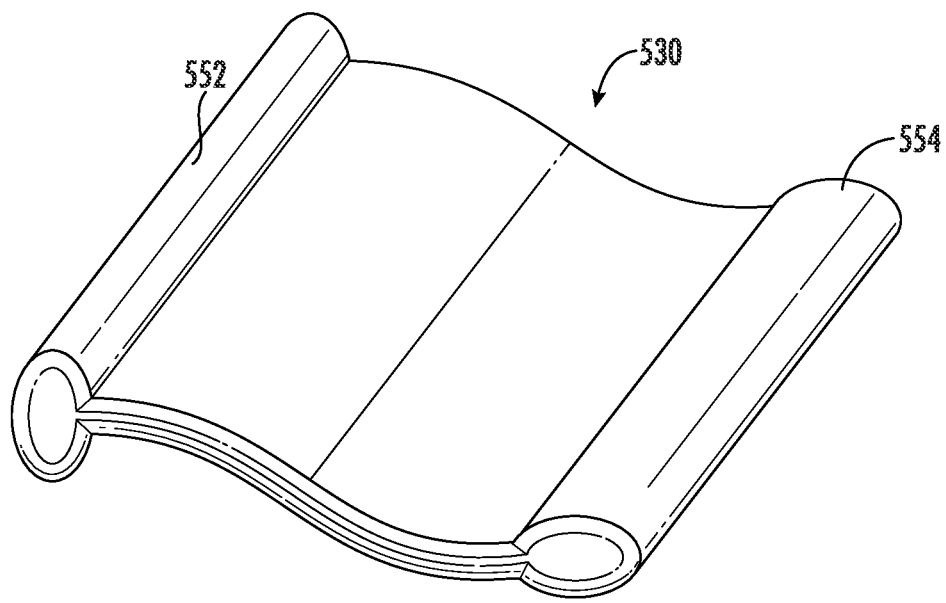
FIG. 11 is a perspective view of the support element of FIG. 10.

For example, referring to FIGS. 10-11, a support element 530 is shown that includes a second interface member 554 having the same cross-sectional shape as the first interface member 552. In the embodiment shown, both the first interface member 552 and the second interface member 554 have an elliptical cross-sectional shape. However, an orientation of the first interface member 552 is rotated relative to the second interface member 554 when viewed along the longitudinal direction (as shown in FIG. 10). In the embodiment of FIGS. 10-11, the first interface member 552 is rotated approximately 90 degrees relative to the orientation of the second interface member 554. Such an arrangement can provide approximately equal resistance to air bypass across each lateral end of the support element 530 while maintaining an even distribution of weight and surface area across the support element 530, which can also facilitate manual manipulation of the support element 530 during installation and removal operations.

Figure 12:
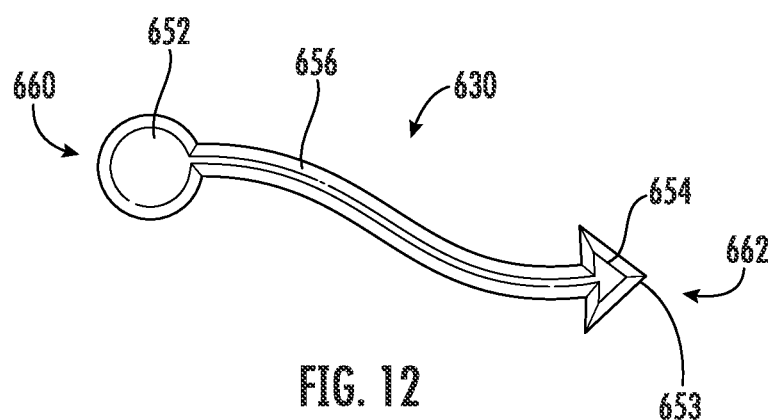
FIG. 12 is a front view of a support element of a filter element for an air cleaner assembly, according to another embodiment.
Figure 13:
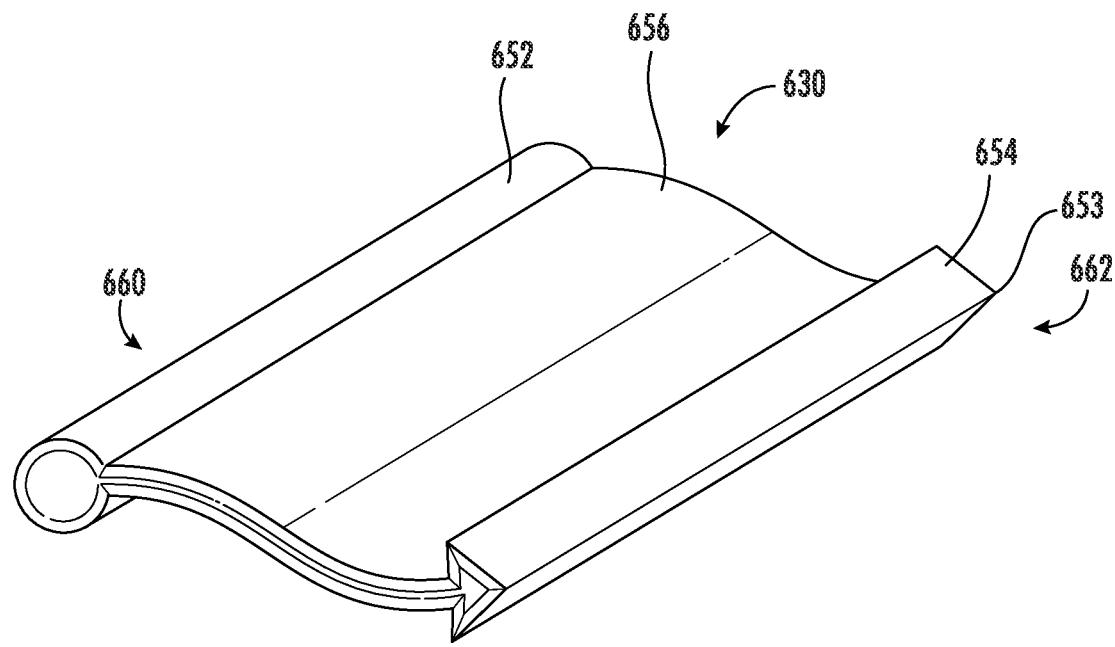
FIG. 13 is a perspective view of the support element of FIG. 10.

Referring to FIGS. 12-13, a support element 630 is shown that includes a first interface member 652 having a different cross-sectional than the second interface member 654. The first interface member 652 has a rounded cross-sectional shape defining a cylindrical protrusion extending along a first lateral end 660 of the support element 630. The second interface member 654 has a triangular cross-sectional shape defining a triangular prism extending along a second lateral end 662 of the support element 630. In the embodiment of FIGS. 12-13, the triangular prism is oriented to point away from the first interface member 652, such that a lateral edge 653 of the support element 630 is defined by a vertex 655 of the triangular prism. Together, the first interface member 652, the second interface member 654, and the connecting member 656 define an arrow shape that indicates an airflow direction through the filter element. Such an arrangement can provide a visual indication to a user or technician of how to orient the filter element without the need for a separate indicator/label on the filter element, and without the need to examine the filter housing.

Figure 14:
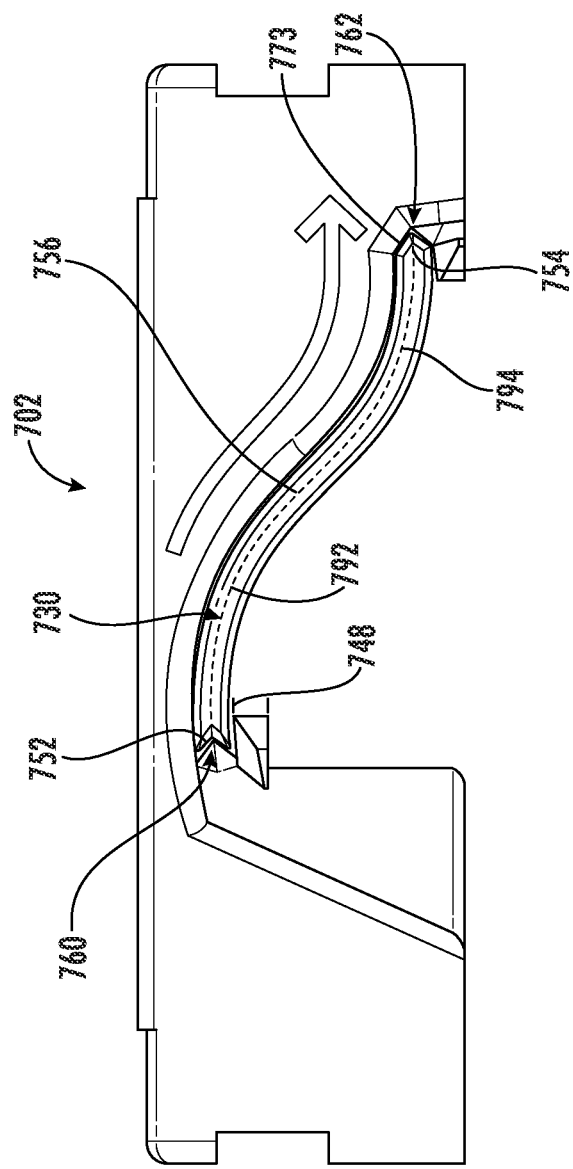
FIG. 14 is a front view of a rail system for an air filter assembly, according to an embodiment.

In some embodiments, the first interface element and/or the second interface element include slots and/or channels that are formed into the support element. Referring to FIG. 14, a support element 730 is shown that includes interface elements defined by pointed or wedge-shaped ends on either side of the support element 730. The first interface member 752 is defined by a notch 753 extending along the first lateral end 760 of the support element 730 and inwardly toward a concave portion 792 of the connecting member 756. The notch 753 defines a channel extending inwardly from a side of the connecting member 756 and along the entire first lateral end 760 of the support element 730.

The second interface member 754 is defined by a V-shaped protrusion (a protrusion having a V-shaped cross section when viewed along the longitudinal direction) extending along the second lateral end 762 of the support element 730 and away from the notch 753 and away from a convex portion 794 of the connecting member 756 opposite the concave portion 792. A lateral edge of the second interface member 754 is defined by the apex of the V-shaped protrusion.

Together, the first interface member 752 and the second interface member 754 define an arrow that is oriented to visually indicate a flow direction through the filter element. In at least one embodiment, as shown in FIG. 14, the housing 702 also includes a visual indicator that corresponds with a shape formed by the arrow.

The first interface member 752 and the second interface member 754 are structured to wedge against complementary receiving structures 773 defined by the housing rail 748. For example, the housing rail 748 and/or housing 702 may include a V-shaped housing protrusion on a first side of the housing rail 748 having a complementary shape as the notch 753 and that is configured to nestably engage the notch 753. The housing rail 748 and/or housing 702 may include a housing notch on a second side of the housing rail 748 having a complementary shape as the V-shaped protrusion of the support element 730 and that is configured to nestably engage the V-shaped protrusion. The pointed ends of the support element 730 and the housing rail 748 engage one another during installation and provide a tortuous flow path that further restricts the flow of air between the housing 702 and the support element 730.

Figure 15:
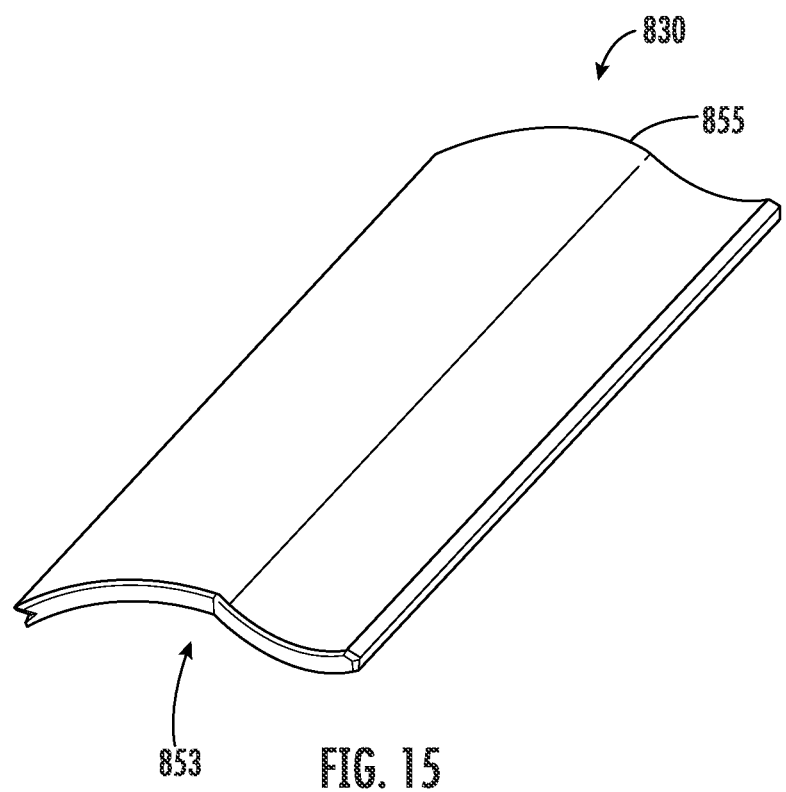
FIG. 15 is a perspective view of a support element of the rail system of FIG. 14.
Figure 16:
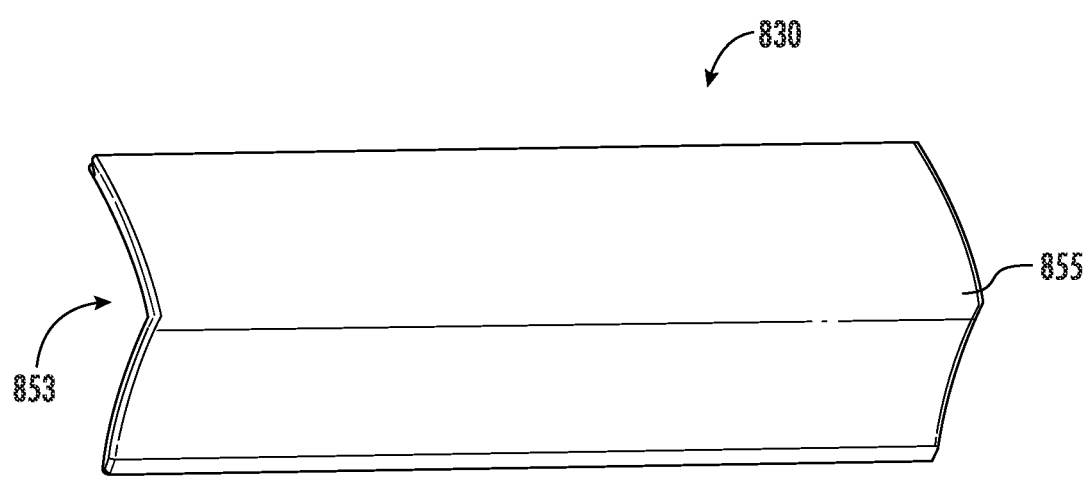
FIG. 16 is a front view of the support element of FIG. 15.
Figure 17:
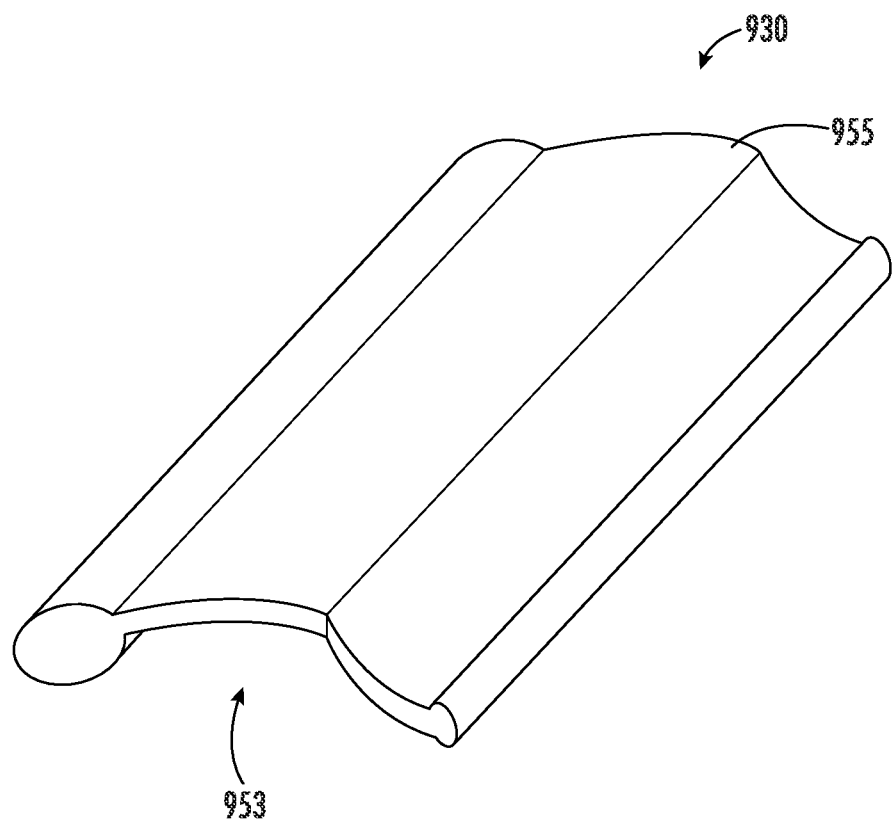
FIG. 17 is a perspective view of a support element of a rail system, according to another embodiment.
Figure 18:
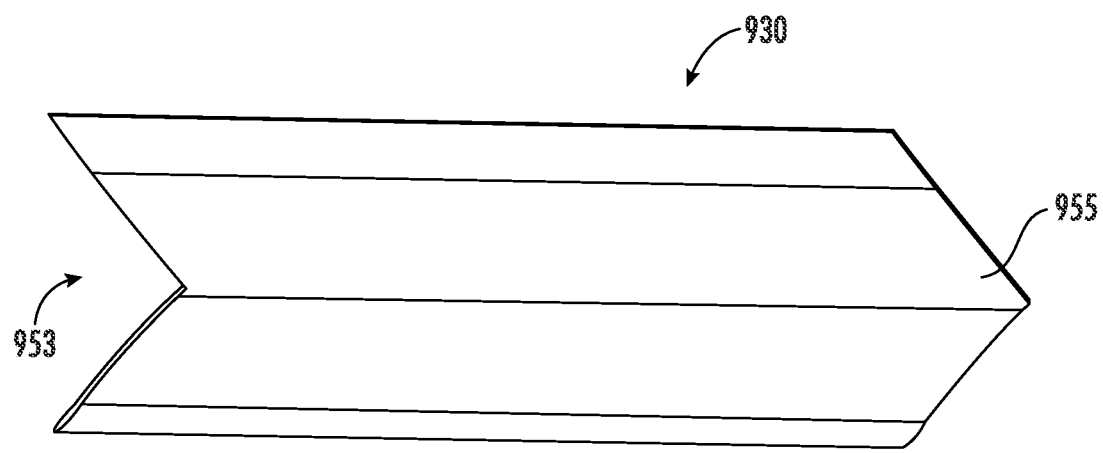
FIG. 18 is a front view of the support element of FIG. 17.

Referring to FIGS. 15-17, pointed and/or cutoff ends may also be formed on opposing longitudinal ends of the support element 830, 930, which can provide an additional visual indicator of the proper insertion direction of the filter element into the filter housing. In the embodiment of FIGS. 15-17, the support elements 830, 930 include a notch and/or V-shaped cutout 853, 953 on a first longitudinal end of the support element 830, 930 (when viewed from above the support element 830, 930), and a V-shaped protrusion 855, 955 on a second longitudinal end of the support element 830, 930. Together, the V-shaped protrusion 855, 955 and the V-shaped cutout 853, 953 defines an arrow shape that indicates the insertion direction of the filter element. In some embodiments, the pointed and/or cutoff ends are engageable with complementary shaped protrusions and/or notches in the housing, at opposing lateral ends of the housing (e.g., via corresponding protrusions/notches in the cover and housing) which can prevent a user from improperly installing the filter element into the filter housing.

It should be understood that the shape of the projection or cutoff at opposing longitudinal ends of the support element may be different in various embodiments. For example, in some embodiments, the notch on the first longitudinal end may have a U-shaped profile, a semi-circular shape, an elliptical shape, a rectangular cutout shape, or another shape. In some embodiments, the notch may be inset or spaced radially inward from lateral ends of the support element 830, 930. In some embodiments, the support element 830, 930 may include multiple notches and/or protrusions on at least one longitudinal end of the support element 830, 930.

Referring again to FIG. 7, the connecting member 356 engages both the first interface member 352 and the second interface member 354, and couples the first interface member 352 to the second interface member 354. The connecting member 356 extends from the first interface member 352, on an inner lateral side of the first interface member 352, to an inner lateral side of the second interface member 354.

In at least one embodiment, the connecting member 356 is configured to reduce pressure drop across the air filter assembly 300. The connecting member 356 includes a concave portion 392 (e.g., a concave extension, a concave wall, etc.) extending from the inner lateral side of the first interface member 352 and toward the second interface member 354. The connecting member 356 also includes a convex portion 394 (e.g., a convex extension, a convex wall, etc.) extending from an inner lateral side of the second interface member 354 and toward the first interface member 352. Together, the concave portion 392 and the convex portion 394 define an undulating wall or panel between the first interface member 352 and the second interface member 354. In other embodiments, the connecting member 356 may include only one of the concave portion 392 or the convex portion 394. For example, the connecting member 356 may include a curve of approximately constant radius between opposing lateral ends of the connecting member 356, a curve of continuously or semi-continuously varying radius, etc. In other embodiments, the connecting member 356 may include uncurved portions (e.g., linear/planar portions), alone or in combination with curved portions. For example, the connecting member 356 may include two, three, four, or more planar portions that extend in an at least partially lateral direction (e.g., in stepwise fashion, etc.) between the first interface member 352 and the second interface member 354.

In some embodiments, the concave portion 392 and the convex portion 394 are walls (e.g., a concave wall and a convex wall, respectively) that extend parallel to one another in two different locations along the connecting member 356. In the embodiment of FIG. 7, the concave portion 392 and the convex portion 394 extend parallel to one another adjacent to lateral ends of the connecting member 356 (e.g., where the concave portion 392 engages the first interface member 352 and where the convex portion 394 engages the second interface member 354). Referring still to FIG. 7, in some embodiments, the first interface member 352 is positioned vertically above the second interface member 354 when lateral end portions of the connecting member 356 are oriented parallel to a horizontal reference plane extending through the connecting member 356. The orientation and shape of the connecting member supports the end pleat 344 of the filter media pack 328 in an open orientation after installation into the filter housing 302.

In the embodiment of FIG. 7, a radius of curvature 396 of the concave portion 392 is approximately equal to a radius of curvature 398 of the convex portion 394 (e.g., by within (+) or (−) 10%, 5%, or 1% of one another). In such an arrangement, the concave portion 392 may be tangent to the convex portion 394 at a location at which the concave portion 392 engages the convex portion 394. It should be appreciated that the radius of curvature of one or more portions of the support element 330 may be different in various embodiments. The combination of the concave portion 392 and the convex portion 394 can reduce flow separation along an upper wall of the enclosure 312, which can reduce pressure drop across the air filter assembly 300.

The filter media pack 328 extends across the connecting member 356 between the first interface member 352 and the second interface member 354. In at least some embodiments, the end pleat 344 is bonded to the surface of the connecting member 356, which may be bent or otherwise formed into the same shape as the connecting member 356. Referring to FIGS. 8-9, in some embodiments, the connecting member 456 also includes a planar portion 493 (e.g., a planar extension, a planar wall, a planar panel, etc.) extending from the concave portion 492 to the convex portion 494. In some embodiments, the filter media is bonded to the planar portion 493 to increase the structural integrity of the connection between the filter media pack and the connecting member 456.

Rail Guide

Referring again to FIG. 6, the rail guide 350 (e.g., installation guide, etc.) is configured to simplify installation of the support element 330 into the housing rail 348. The rail guide 350 may be welded, fastened, or otherwise coupled to an enclosure 312 (see FIG. 6) of the filter housing 302 proximate to the access opening 322. In other embodiments, the rail guide 250 is directly coupled to the housing rail 348. In some embodiments, the rail guide 350 defines a portion of the access opening 322.

In at least one embodiment, the rail guide 350 is formed as a separate piece from the housing rail 348 and the enclosure 312 and is removably coupled to the enclosure 312. Such an arrangement can enable retrofit of the filter housing 302 to accommodate different rail guide designs.

Figure 19:
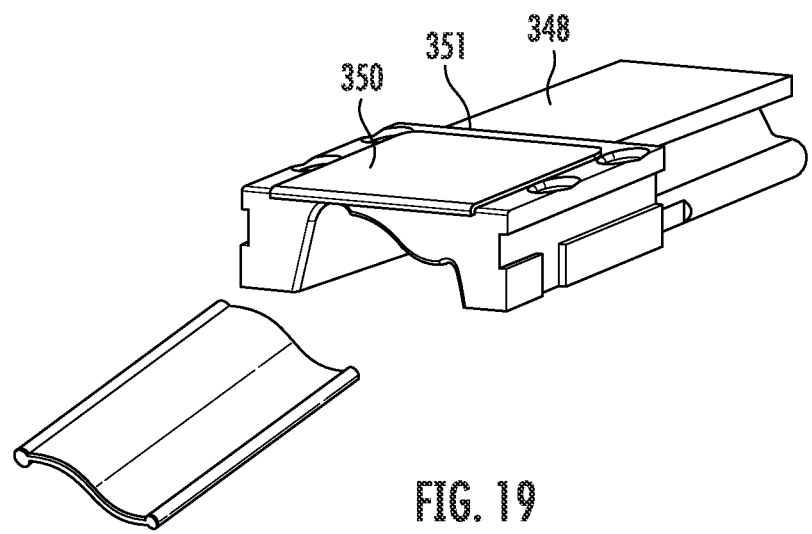
FIG. 19 is a front perspective view of a rail system for the air filter assembly of FIG. 6.
Figure 20:
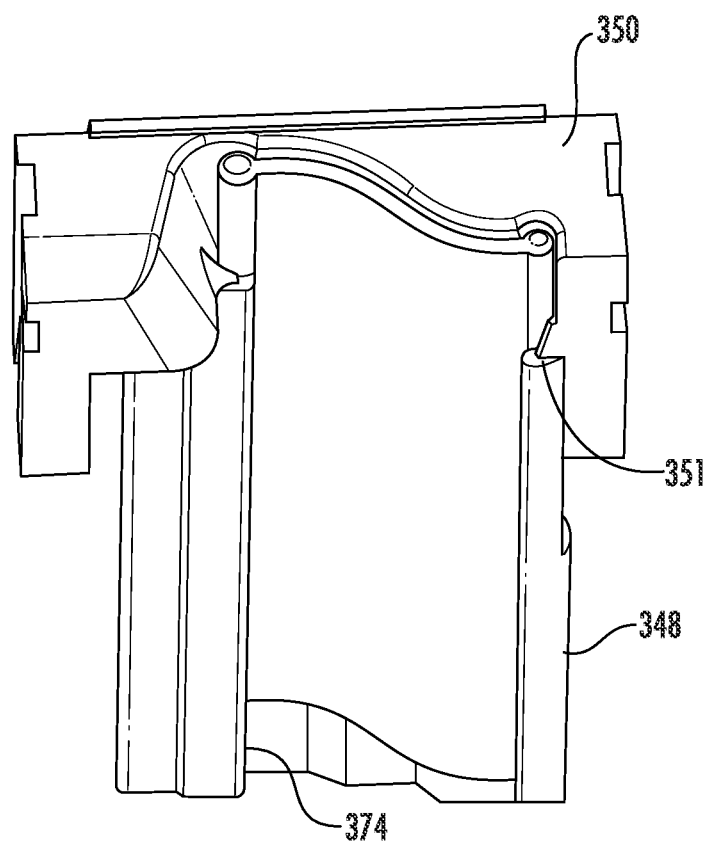
FIG. 20 is a bottom perspective view of the rail system of FIG. 19.

Referring to FIGS. 19-20, the rail guide 350 engages a leading edge 351 of the housing rail 348 and extends from the housing rail 348 to the access opening 322 (see also FIG. 6). The rail guide 350 provides a gradual transition extending from the housing rail 348 to the access opening 322. The rail guide 250 guides the support element 330 (e.g., the first interface member 352 and the second interface member 354) into the housing rail 348 and into channel openings 374 of the housing rail 348. In some embodiments, the rail guide 350 extends below the housing rail 348 and into the inner cavity 314, which can prevent the use of filter elements that do not include a complementary support element by blocking a portion of the access opening of the air filter housing.

Figure 21:
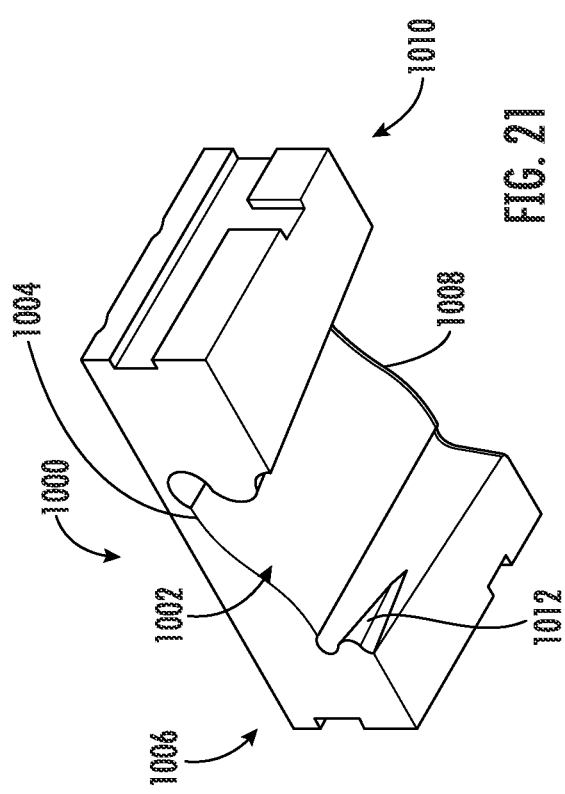
FIG. 21 is a bottom perspective view of a rail guide for an air filter assembly, according to an embodiment.
Figure 23:
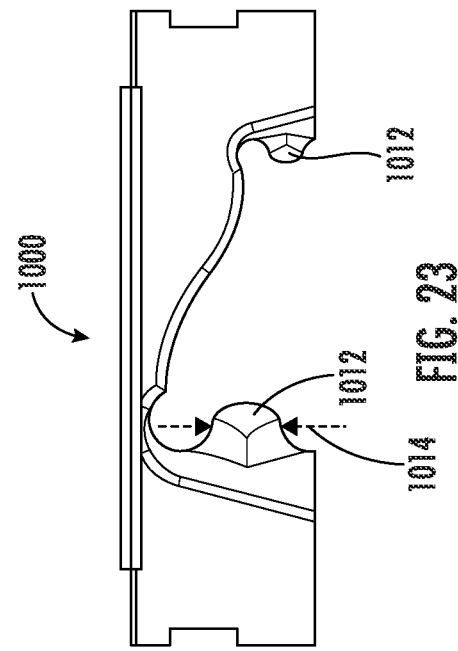
FIG. 23 is a front view of the rail guide of FIG. 21.
Figure 22:
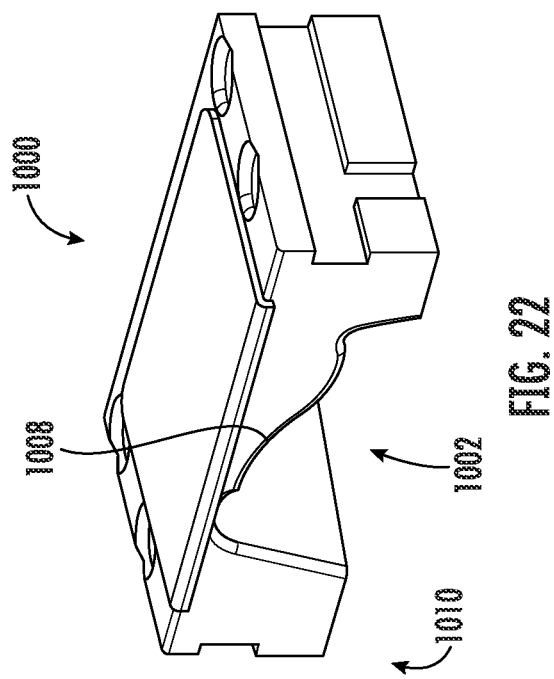
FIG. 22 is a front perspective view of the rail guide of FIG. 21.
Figure 27:
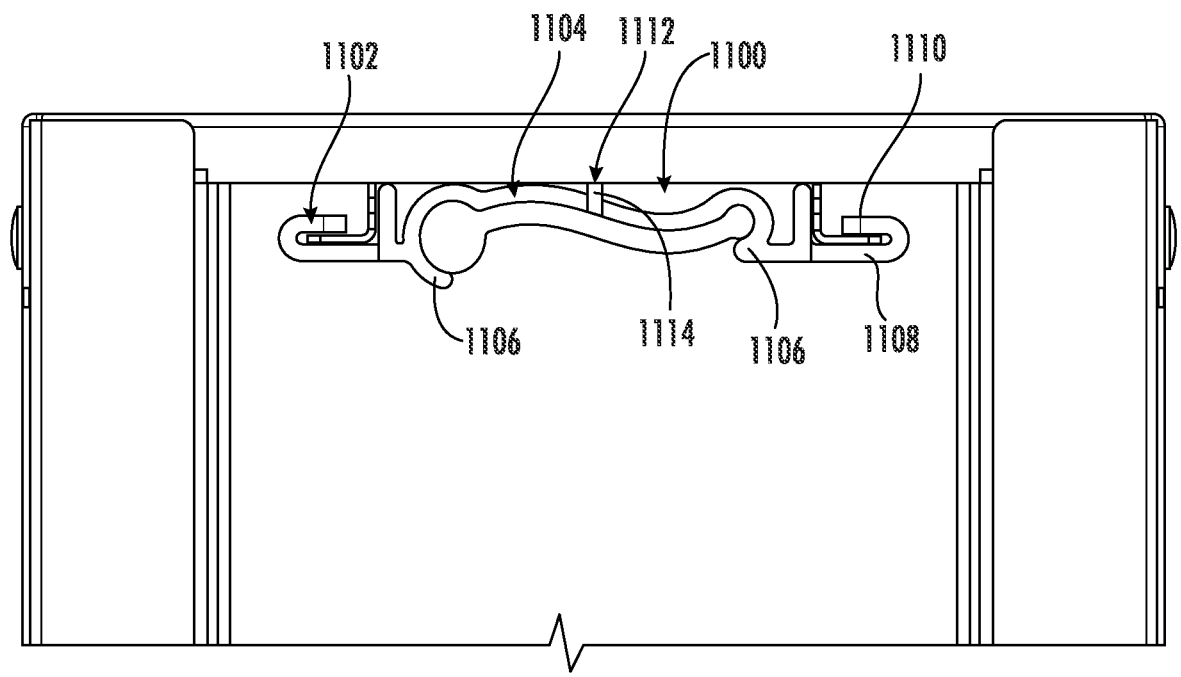
FIG. 27 is a side view of an air cleaner assembly that includes a housing adapter, according to an embodiment.

Referring to FIGS. 21-23, another embodiment of a rail guide 1000 (e.g., alignment element, alignment block, etc.) is shown that is similar to the rail guide 350 of FIG. 6. The rail guide 1000 defines a funnel shaped channel 1002 that is tapered between a first funnel opening 1004 at a first end 1006 of the rail guide 1000, and a second funnel opening 1008 at a second end 1010 of the rail guide 1000.

The funnel shaped channel 1002 has a cross-sectional shape that corresponds with (e.g., is the same as, etc.) the shape of the support element on at least one end of the funnel shaped channel 1002. In the embodiment of FIGS. 21-23, an upper surface of the funnel shaped channel 1002 has the same shape as the connecting member of the support element. In particular, the upper surface of the funnel shaped channel 1002 includes a concave portion and a convex portion extending from the concave portion to an opposing end of the upper surface. In at least one embodiment, the rail guide 1000 includes guide elements 1012 (e.g., guide rails, etc.) extending inwardly from sidewalls of the funnel shaped channel 1002. The guide elements 1012 may include protrusions or extension pieces forming ledges on either side of the funnel shaped channel 1002 and at least partially defining a lower end of the funnel shaped channel 1002. In the embodiment of FIGS. 21-23, the guide elements 1012 extend along only a portion of the funnel shaped channel 1002. The guide elements 1012 extend from the second end 1010 of the rail guide 1000 to an intermediate position between the second end 1010 and the first end 1006. In other embodiments, the length of the guide elements 1012 may be different (e.g., the guide elements 1012 may extend an entire length of the funnel shaped channel 1002 along an insertion direction of the filter element, etc.

In at least one embodiment, at least one of the guide elements 1012 is tapered so that a cross-sectional area of the funnel shaped channel 1002 decreases continuously or semi-continuously from the first end of the funnel shaped channel 1002 to the second end of the funnel shaped channel 1002 at the housing rail. In the embodiment of FIG. 21, a thickness 1014 of the guide elements 1012 decreases with increasing distance from the housing rail, or from the second end 1010 toward the first end 1006 of the rail guide 1000.

Among other benefits, the rail guide 1000 facilitates alignment between the support element and the housing rail during installation by providing greater clearances to accommodate the support element than the housing rail. Because the user does not need to align the support element with the housing rail manually, the use of the rail guide 1000 can also allow for the use of tighter clearances between the support element and the housing rail, which can improve sealing between the filter element and the air filter housing.

Referring to FIGS. 24-26, another embodiment of a rail guide 1050 (e.g., alignment element, alignment block, etc.) is shown that is configured to facilitate installation of a filter element into a filter housing. The rail guide 1050 defines a funnel shaped channel 1052 that is tapered between a first funnel opening 1054 at a first end 1056 of the rail guide 1050, and a second funnel opening 1058 at a second end 1060 of the rail guide 1050.

The rail guide 1050 includes a plurality of sidewall surfaces 1062 that together define the funnel shaped channel 1052, including a first lateral surface 1064 (e.g., a first surface, a first interface surface, etc.), a second lateral surface 1066 (e.g., a second surface, a second interface surface, etc.), and an intermediate surface 1068 (e.g., a third surface, a third interface surface, etc.) extending between the first lateral surface 1064 and the second lateral surface 1066. In the embodiment of FIGS. 24-26, the first lateral surface 1064 and the second lateral surface 1066 are tapered along their entire length. In some embodiments, the first lateral surface 1064 and the second lateral surface 1066 are tapered along an entire length of the rail guide 1050. In other embodiments, as shown in FIGS. 24-26, the rail guide 1050 includes a tapered or chamfered surface 1070 that extends along a perimeter of the first funnel opening 1054 between the surfaces 1064, 1066, 1068 and the first end 1056, which can accommodate greater misalignment between the filter element endplate structure and the rail guide 1050 during installation.

The first lateral surface 1064 and the second lateral surface 1066 define complementary receiving structures for interface members on each lateral end of the support element (e.g., the endplate structure of the filter element). In some embodiments, a cross-sectional shape of each of the receiving structures corresponds with (e.g., matches, etc.) a cross-sectional shape of a respective one of the interface members.

In the embodiment of FIGS. 24-26, the first lateral surface 1064 and the second lateral surface 1066 have a curved perimeter shape at a first end 1056, and a second end 1060 such that the first lateral surface 1064 and the second lateral surface 1066 each define a funnel having a diameter that decreases continuously between the first end 1056 and the second end 1060. In the embodiment of FIGS. 24-26, the first lateral surface 1064 and the second lateral surface 1066 each define a funnel having a circular cross section. In other embodiments, the shape of at least one of the funnels may be different (e.g., an elliptical cross section, a rectangular cross section, a triangular cross section, etc.). The dual funnel arrangement can further simplify filter element installation by providing a continuously decreasing surface that doesn't require any intermediate alignment operations between the first end 1056 and the second end 1060 of the rail guide 1050.

Housing and Endplate Adapter

Referring to FIGS. 27-30, a housing adapter 1100 is shown that is configured to enable installation of any of the filter elements disclosed herein within an existing filter housing. The housing adapter 1100 includes a guide rail 1104 and a housing interface 1102. In some embodiments, the housing interface 1102 is disposed on an opposite end of the housing adapter 1100 as the guide rail 1104. In the embodiment of FIGS. 27-30, the guide rail 1104 is defined by a central region of the housing adapter 1100. The housing interface 1102 is disposed laterally outward of the guide rail 1104.

The guide rail 1104 may be shaped similar to (e.g., the same as) any of the housing rail designs disclosed herein. The guide rail 1104 includes receiving structures 1106 (e.g., rail members, rail legs, etc.) that have the same or similar shape as respective ones of the interface members of the support element.

The housing interface 1102 includes housing interface members 1108 (e.g., track interface members, etc.) that are configured to engage a housing rail of the filter housing to support the filter element on the housing rail. In the embodiment of FIGS. 27-30, the housing interface members 1108 include curved protrusions 1110 (e.g., curved guide tabs, etc.) that slidably engage the housing rail. In other embodiments, the housing interface members 1108 may include clips, fastener tabs, or another type of connector to secure the housing adapter 1100 to the housing rail.

Figure 28:
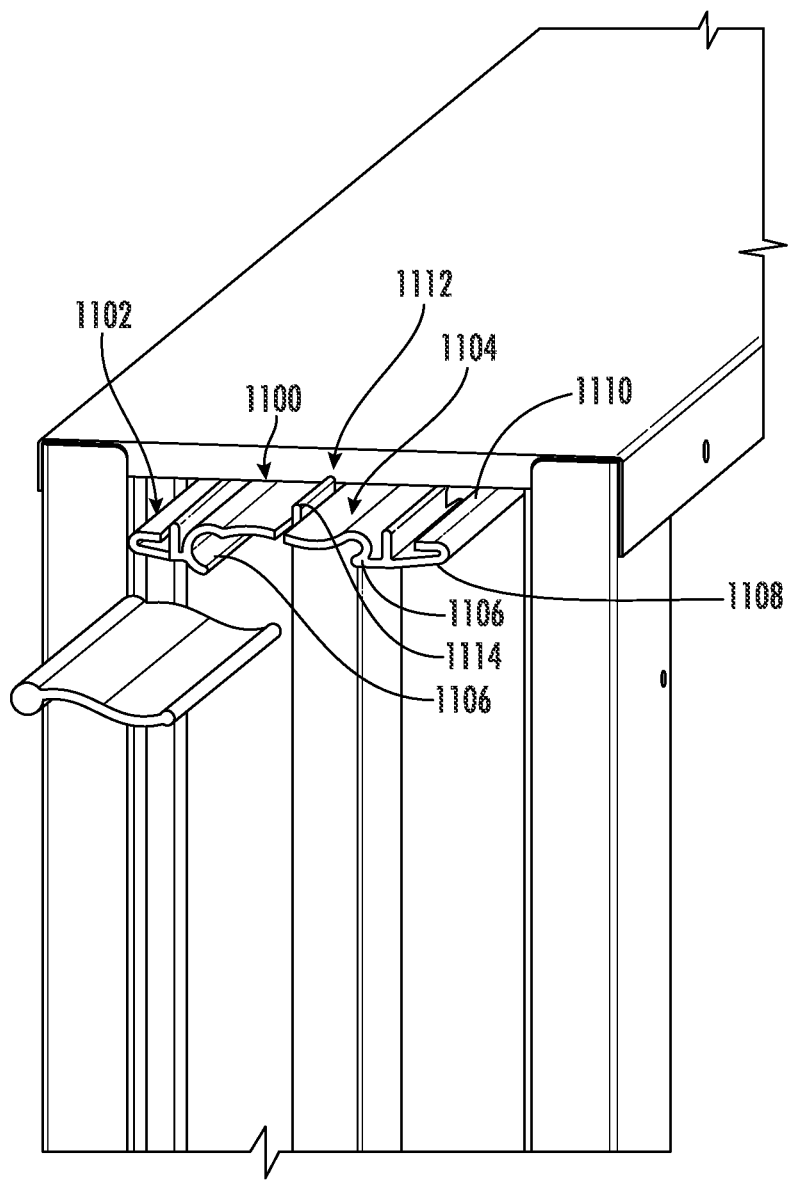
FIG. 28 is a perspective view of the air cleaner assembly of FIG. 27 during installation of a filter element into a filter housing of the air cleaner assembly.

Referring to FIG. 28, in some embodiments, the housing adapter 1100 includes a locking member 1112 to secure the housing adapter 1100 to the filter housing and to prevent removal of the housing adapter 1100 from the filter housing. For example, the housing adapter 1100 may include a central rib 1114 extending from a longitudinal end of the housing adapter 1100. The rib 1114 may be made from a flexible material, or may be positioned on a flexible portion of the housing adapter 1100 such that the rib 1114 deflects during insertion of the housing adapter 1100 and snaps, clips, or otherwise fastens against an outer ledge of the filter housing (e.g., a side ledge of the enclosure that defines the access opening).

It should be understood that a similar adapter design could enable use of filter elements with different endplate geometries than those described herein. Referring to FIGS. 31-36, a filter endplate adapter 1200 (e.g., a support element, a frame element, etc.) is shown that is configured to retrofit an existing filter element endplate to allow installation of the filter element into any of housing rail designs disclosed herein. The filter endplate adapter 1200 includes a rail interface 1202 and an endplate interface 1204. In some embodiments, the rail interface 1202 is disposed on an opposing end of the filter endplate adapter 1200 as the rail interface 1202. In other embodiments, the endplate interface 1204 extends outwardly from the rail interface 1202 (or vice versa).

The rail interface 1202 is configured to engage the housing rail. The rail interface 1202 may be shaped the same as any of the support member designs described herein. In the embodiment of FIGS. 31-36, the rail interface 1202 includes a first interface member 1206; a second interface member 1208 spaced apart from and oriented parallel to the first interface member 1206; and a connecting member 1210 disposed between the first interface member 1206 and the second interface member 1208.

The endplate interface 1204 includes a structure that is adapted to couple the filter endplate adapter 1200 to a filter element endplate/endcap. In at least one embodiment, the endplate interface 1204 includes a pair of rail guides 1212 that extend parallel to the first interface member 1206 and the second interface member 1208. In other embodiments, the endplate interface 1204 includes another type of clip or fastening mechanism to secure the filter endplate adapter 1200 to a filter element endplate/endcap.

Figure 36:
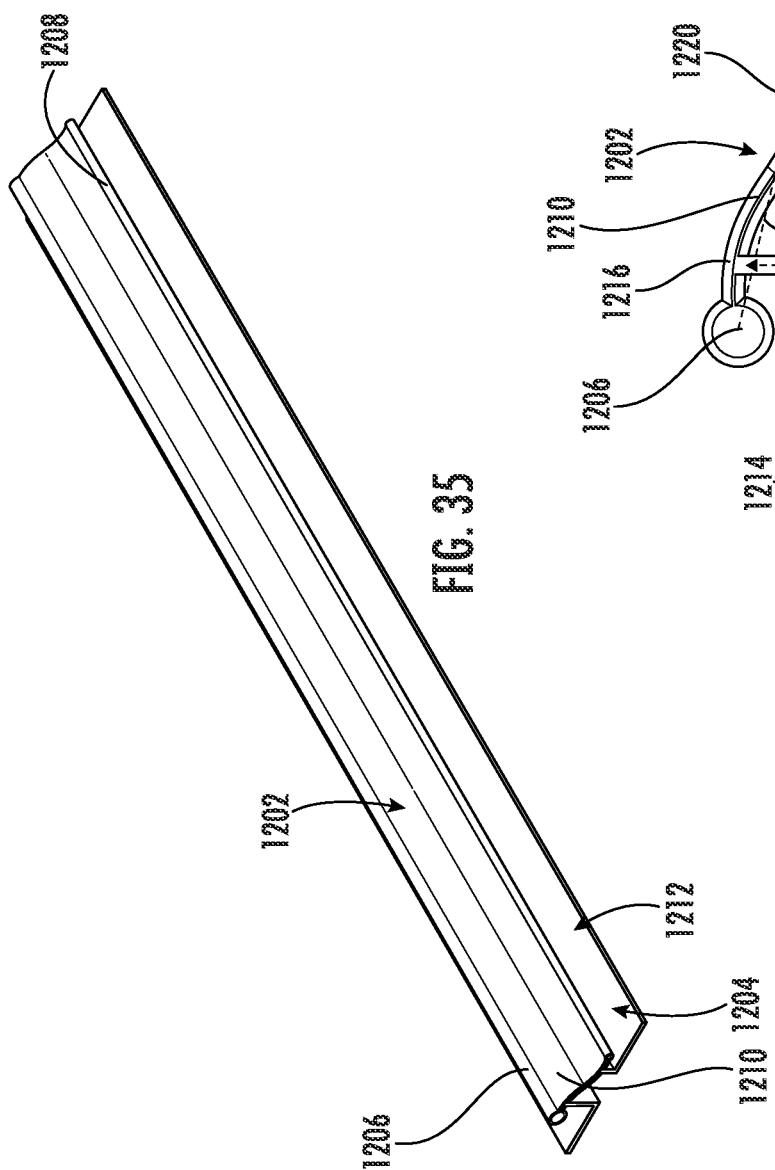
FIG. 36 is a front view of the filter endplate adapter FIG. 33.
Figure 37:
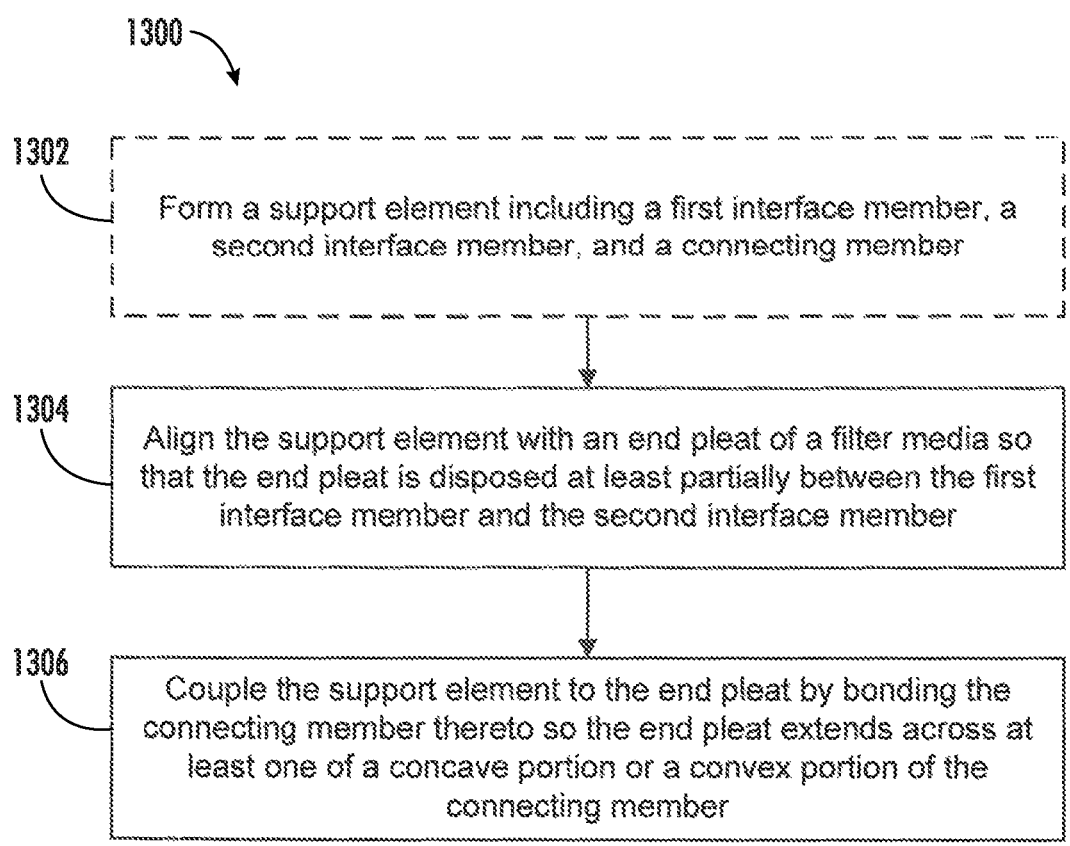
FIG. 37 is a flow diagram of a method of making a filter element, according to an embodiment.
Figure 38:
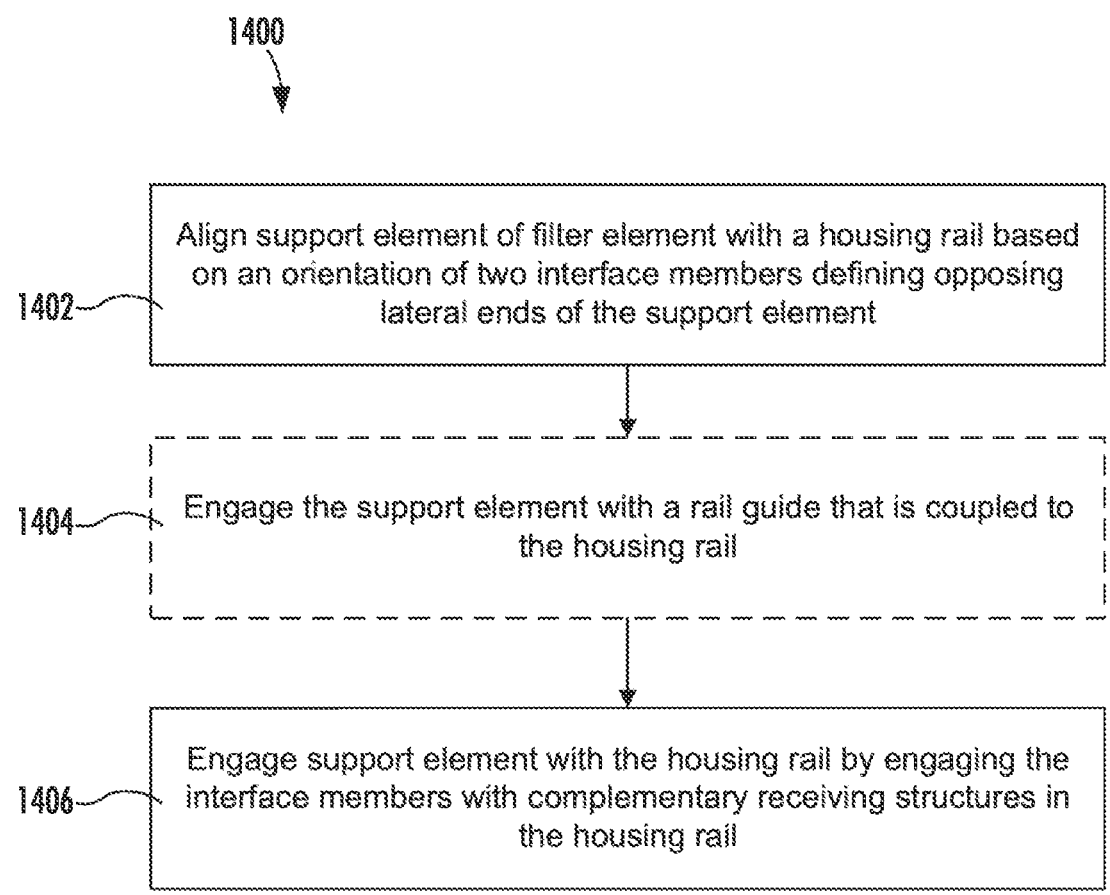
FIG. 38 is a flow diagram of a method of installing a filter element into a filter housing, according to an embodiment.

As shown in FIG. 36, the rail guides 1212 are "L" shaped members that extend from the connecting member 1210. A first rail guide 1214 of the pair of rail guides 1212 extends away from a concave portion 1216 of the connecting member 1210. A second rail guide 1218 of the pair of rail guides 1212 extends away from a convex portion 1220 of the connecting member 1210 in substantially parallel orientation with respect to the first rail guide 1214.

In at least one embodiment, as shown in FIG. 36, the rail guides 1218 are configured to support the rail interface 1202 at an angle 1221 above a media pack of the filter element. A height 1222 of the second rail guide 1218 is less than a height 1224 of the first rail guide 1214 so that the concave portion 1216 of the rail interface 1202 is positioned vertically above the convex portion 1220. Such an arrangement enables supporting the filter element in a perpendicular orientation relative to the flow direction therethrough. It should be appreciated that the design and arrangement of the endplate interface 1204 may be different in various embodiments.

Method of Making a Filter Element

Referring to FIG. 28, a method 1300 of manufacturing a filter element is shown, according to an embodiment. At 1302, a support element is formed that includes a first interface member; a second interface member spaced laterally apart from the first interface member and extending parallel to the first interface member; and a connecting member joining the first interface member to the second interface member.

In some embodiments, operation 1302 includes forming a curved and/or undulating wall and/or panel that extends (e.g., in a serpentine manner) between the first interface member and the second interface member so that a concave portion of the undulating wall extends from the first interface member and a convex portion of the undulating wall extends from the second interface member.

In some embodiments, operation 1302 includes forming the support element from a single piece of material via an extrusion process so that the first interface member, the second interface member, and the connecting member all have the same cross-sectional shape along an entire length of the support element.

At 1304, the support member is aligned with an end pleat of a filter media (e.g., a filter media pack) so that the end pleat is disposed between a first interface member of the support element and a second interface member of the support element, each of the first interface member and the second interface member extending along opposing lateral ends of the support element. In some embodiments, operation 1304 includes centering the end pleat within a channel defined by the first interface member, the second interface member, and the connecting member.

At 1306, the support element is coupled to the end pleat by bonding the connecting member of the support element (e.g., a connecting member that extends from the first interface member to the second interface member) to the end pleat so that the end pleat extends across at least one of a concave portion of the connecting member (e.g., a concave portion that extends from the first interface member) or a convex portion of the connecting member (e.g., a convex portion that extends from the second interface member). In some embodiments, operation 1306 includes dispensing an adhesive material onto at least one of the end pleat and the channel defined by the first interface member, the second interface member, and the connecting member, and pressing the end pleat into the channel. In some embodiments, bonding the connecting member to the end pleat includes bonding a planar portion of the connecting member that extends from the concave portion to the convex portion of the connecting member to the end pleat.

Method of Installing a Filter Element

Figure 29:
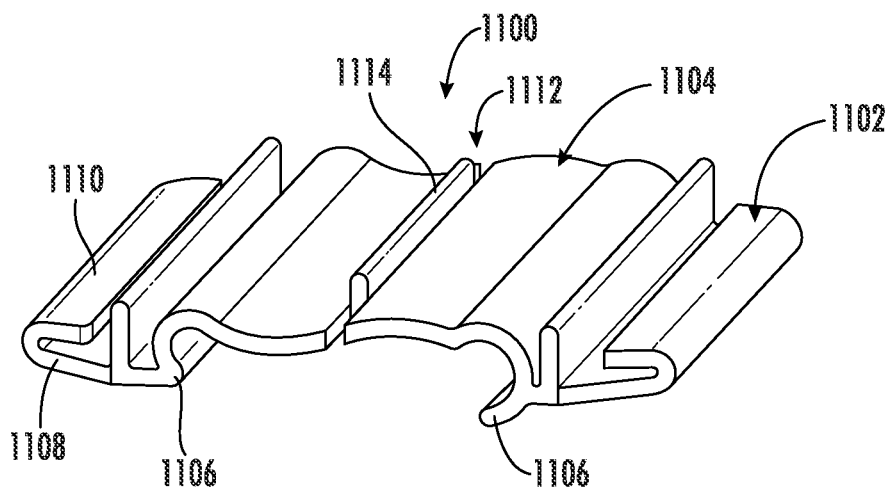
FIG. 29 is a perspective view of the housing adapter of FIG. 27.
Figure 30:
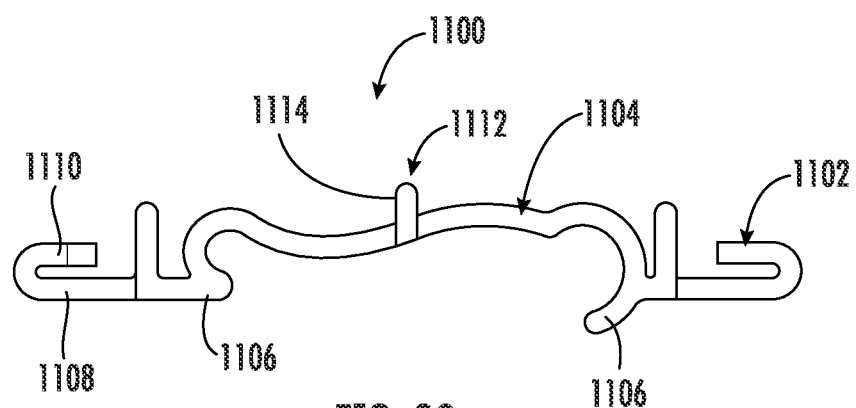
FIG. 30 is a side view of the housing adapter of FIG. 27.
Figure 35:
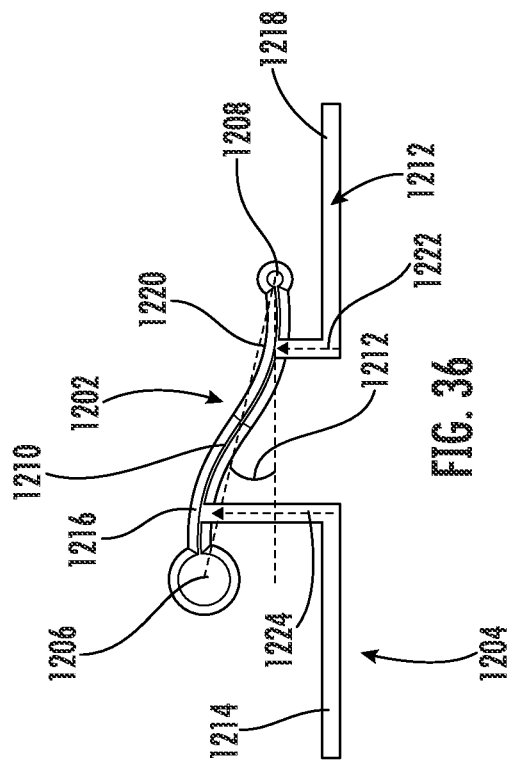
FIG. 35 is a perspective view of the filter endplate adapter of FIG. 33.

Referring to FIG. 29, a method 1400 of installing a filter element into a filter housing is shown, according to an embodiment. At 1402, a support element of a filter element is aligned with a housing rail of a filter housing. In some embodiments, operation 1402 includes orienting the filter element based on an indication of flow direction through the filter element. For example, operation 1402 may include aligning the support element with the housing rail based on an orientation of a pair of interface members of the support element that define opposing lateral ends of the support element. In some embodiments, operation 1402 may include orienting the filter element so that a larger one of the pair of interface members is disposed on an upstream side of the filter housing (e.g., so that the interface member having the largest cross-sectional profile is disposed on an upstream side of the filter housing). In other embodiments, operation 1402 may include orienting the filter element so that an arrow shape formed by at least one of the interface members of the support element, or the connecting member of the support element, points or is directed along the air flow direction through the filter housing.

At 1404, the support element is engaged with a rail guide that is coupled to the housing rail and that may extend below the housing rail. Operation 1404 may include aligning the support member with a funnel shaped channel of the rail guide having a cross-sectional shape that corresponds with the shape of the support element. Operation 1404 may include placing each of the interface members on a respective one of a pair of tapered guide elements that extend inwardly from sidewalls of the funnel shaped channel. In some embodiments, operation 1404 includes engaging the interface members with surfaces on either side of the guide rail that each define a funnel.

At 1406, the support element is engaged with the housing rail by engaging the interface members with complementary receiving structures in the housing rail. In some embodiments, operation 1406 includes inserting the support element through the rail guide from a first end of the funnel shaped channel to a second end of the funnel shaped channel that has a reduced cross-sectional area compared to the first end. In some embodiments, operation 1406 includes inserting the interface members into a respective one of a pair of channel openings in the housing rail that are defined by the receiving structures, and that may have the same cross-sectional profile (e.g., shape, etc.) as a respective one of the interface members. Operation 1406 may further include inserting the support element into the housing rail to support the filter element within the filter housing.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members, or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present application. For example, any element disclosed in one embodiment may be incorporated or utilized with any other embodiment disclosed herein.

What is claimed is:

1. A filter element for a heating, ventilation, and/or air condition (HVAC) system, the filter element comprising:
  a filter media pack defining a plurality of pleats, the plurality of pleats including an end pleat having a length that extends from a first longitudinal end of the filter media pack to a second longitudinal end of the filter media pack; and
  a support element including:
    a first interface member defining a first lateral end of the support element;
    a second interface member defining a second lateral end of the support element and extending parallel to the first interface member, the first interface member and the second interface member engageable with complementary receiving structures of a rail to support the support element on the rail; and
    a connecting member coupled to the end pleat of the filter media pack along at least a portion of the length of the end pleat and extending from the first interface member to the second interface member, the connecting member including a concave portion extending from the first interface member and a convex portion extending from the second interface member, wherein the concave portion and the convex portion define at least a portion of an undulating surface on a media-facing side of the connecting member, at least a portion of the media-facing side of the connecting member engaging the filter media pack.

2. The filter element of claim 1, wherein the first interface member has a first cross-sectional profile, and the second interface member has a second cross-sectional profile that is different from the first cross-sectional profile.

3. The filter element of claim 2, wherein at least one of the first cross-sectional profile or the second cross-sectional profile defines a rounded shape having curved side surfaces.

4. The filter element of claim 2, wherein the first cross-sectional profile of the first interface member and the second cross-sectional profile of the second interface member are uniform along an entire length of the first interface member and the second interface member, respectively.

5. The filter element of claim 2, wherein a width of the first cross-sectional profile is different from a width of the second cross-sectional profile.

6. The filter element of claim 1, wherein a radius of curvature of the concave portion is equal to a radius of curvature of the convex portion.

7. The filter element of claim 1, wherein at least one of the first interface member or the second interface member is a cylindrical protrusion.

8. The filter element of claim 1, wherein the first interface member is defined by a notch extending along the first lateral end and inwardly toward the concave portion, and the second interface member is defined by a V-shaped protrusion extending along the second lateral end and away from the notch.

9. The filter element of claim 1, wherein the second interface member has the same cross-sectional shape as the first interface member, and wherein an orientation of the first interface member is rotated with respect to the second interface member.

10. The filter element of claim 1, wherein the concave portion and the convex portion together define an undulating wall.

11. The filter element of claim 1, wherein the connecting member further includes a planar portion extending from the concave portion to the convex portion, wherein the filter media pack is bonded to the planar portion.

12. A filter element for a heating, ventilation, and/or air condition (HVAC) system, the filter element comprising:
  a filter media pack; and
  a support element including:
    a first interface member extending along a longitudinal direction;

a second interface member spaced apart from the first interface member and extending parallel to the first interface member, the first interface member and the second interface member engageable with complementary receiving structures of a filter housing to support the support element within the filter housing; and a connecting member coupled to the filter media pack, the connecting member including:

a concave portion extending from the first interface member in a lateral direction that is perpendicular to the longitudinal direction; and a convex portion extending in the lateral direction between the second interface member and the concave portion, wherein the concave portion and the convex portion define at least a portion of an undulating surface on a media-facing side of the connecting member, at least a portion of the media-facing side of the connecting member engaging the filter media pack.

13. The filter element of claim 12, wherein the first interface member includes a protuberance extending in the longitudinal direction along an entire length of the support element.

14. The filter element of claim 13, wherein the protuberance defines a channel that extends inwardly from a lateral end of the connecting member along the entire length of the support element.

15. The filter element of claim 14, wherein the second interface member includes a curved protrusion extending in the longitudinal direction along the entire length of the support element.

16. The filter element of claim 1, wherein the convex portion is positioned between the concave portion and the second interface member along an entire length of the support element.

17. The filter element of claim 1, wherein the first interface member and the second interface member extend along a longitudinal direction, the concave portion extending from the first interface member in a lateral direction that is perpendicular to the longitudinal direction, and the convex portion extending in the lateral direction between the second interface member and the concave portion.

18. The filter element of claim 1, wherein the first interface member includes a protuberance extending along an entire length of the support element.

19. The filter element of claim 18, wherein the protuberance defines a channel that extends inwardly from a lateral end of the connecting member along the entire length of the support element, the second interface member including a curved protrusion extending parallel to the channel along the entire length of the support element.

20. The filter element of claim 1, wherein the first interface member and the second interface member extend along a longitudinal direction between opposing ends of the connecting member, the end pleat extending across an entire length of the connecting member in the longitudinal direction.

* * * * *